United States Patent
Saishu et al.

(10) Patent No.: US 8,427,528 B2
(45) Date of Patent: Apr. 23, 2013

(54) THREE-DIMENSIONAL IMAGE DISPLAY DEVICE AND THREE-DIMENSIONAL IMAGE DISPLAY METHOD

(75) Inventors: Tatsuo Saishu, Tokyo (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 585 days.

(21) Appl. No.: 11/911,460

(22) PCT Filed: Aug. 31, 2007

(86) PCT No.: PCT/JP2007/067542
§ 371 (c)(1),
(2), (4) Date: Oct. 16, 2009

(87) PCT Pub. No.: WO2008/029929
PCT Pub. Date: Mar. 13, 2008

(65) Prior Publication Data
US 2010/0033556 A1 Feb. 11, 2010

(30) Foreign Application Priority Data
Sep. 7, 2006 (JP) ................................ 2006-243288

(51) Int. Cl.
*H04N 13/04* (2006.01)
*H04N 15/00* (2006.01)

(52) U.S. Cl.
USPC ................................ 348/51; 348/46; 359/463

(58) Field of Classification Search .................... 348/51, 348/42
See application file for complete search history.

(56) References Cited

U.S. PATENT DOCUMENTS

2003/0048354 A1* 3/2003 Takemoto et al. .............. 348/51
2003/0063185 A1* 4/2003 Bell ................................. 348/46
(Continued)

FOREIGN PATENT DOCUMENTS
EP 1 796 401 A1 6/2007
JP 2004-336226 11/2004
(Continued)

OTHER PUBLICATIONS

R. Fukushima, et al., "Three-Dimensional Image Display Device, Three-Dimensional Image Display Method, and Computer Program Product for Three-Dimensional Image Display", U.S. Appl. No. 10/585,691, filed Jul. 10, 2006.

(Continued)

*Primary Examiner* — Kyung H Shin
(74) *Attorney, Agent, or Firm* — Finnegan, Henderson, Farabow, Garrett & Dunner, L.L.P.

(57) ABSTRACT

It is made possible to provide a three-dimensional image display device by which a viewing zone can be readily adjusted in the parallel-ray one-dimensional IP system, without a decrease in processing speed. A three-dimensional image display device includes: an elemental image display unit that has pixels arranged in a matrix form in a display plane, and displays an elemental image; an optical plate that is placed to face the elemental image display unit, extends straightly in a vertical direction, and controls a light ray from the elemental image display unit, the optical plate having optical apertures arranged at intervals in a horizontal direction; and an image data converting unit that converts image data so as to replace missing image data with a neighboring parallax component in same the elemental image, based on the average width of elemental images in an input image data and the optimum average width of elemental images in a three-dimensional video image to be output.

16 Claims, 20 Drawing Sheets

U.S. PATENT DOCUMENTS

| | | |
|---|---|---|
| 2004/0150583 A1 | 8/2004 | Fukushima et al. |
| 2006/0012878 A1* | 1/2006 | Lipton et al. ............... 359/463 |
| 2007/0058034 A1 | 3/2007 | Numazaki et al. |
| 2007/0109620 A1 | 5/2007 | Saishu et al. |

FOREIGN PATENT DOCUMENTS

| | | |
|---|---|---|
| JP | 2004336226 A * | 11/2004 |
| JP | 2006-98779 | 4/2006 |

OTHER PUBLICATIONS

T. Saishu, et al. "Structure of stereoscopic image data, stereoscopic image data recording method, reproducing method, recording program, and reproducing program", U.S. Appl. No. 10/581,364, filed Jun. 2, 2006.

T. Saishu, et al., "53.3: Distortion Control in a One-Dimensional Integral Imaging Autostereoscopic Display System with Parallel Optical Beam Groups," Society for Information Display 2004 Symposium (SID '04) Digest of Technical Papers, pp. 1438-1441 (2004).

M. Levoy, et al. "Light Field Rendering", ACM SIGGRAPH '96, pp. 31-42 (1996).

International Preliminary Report on Patentability issued by the European Patent Office on Dec. 1, 2008, for International Application No. PCT/JP2007/067542.

International Search Report and Written Opinion issued by the European Patent Office on Jan. 22, 2008, for International Application No. PCT/JP2007/067542.

Saishu, U.S. Appl. No. 11/887,917, filed Sep. 3, 2009.

* cited by examiner x-COORDINATE OF EACH CAMERA IMAGE
(LENS NUMBER)

FIG.12 (a)
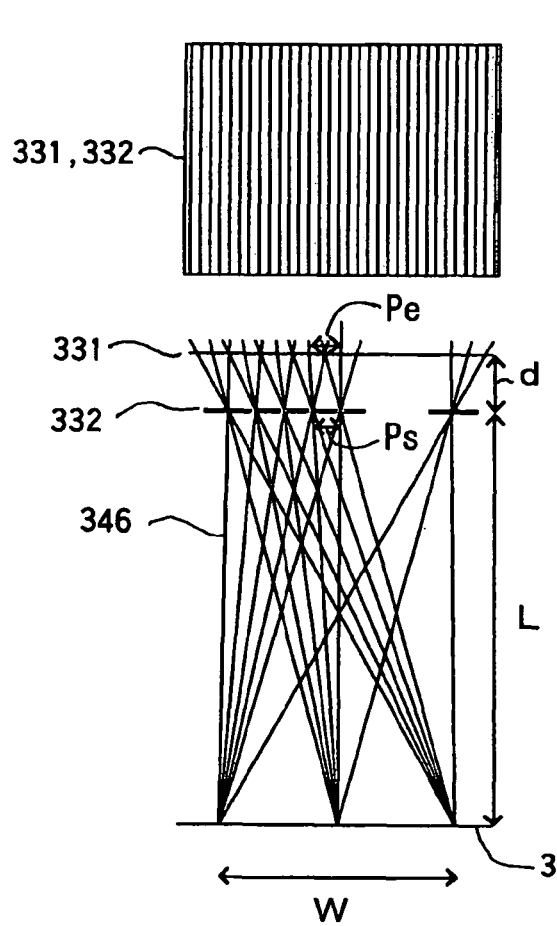
FIG.12 (b)
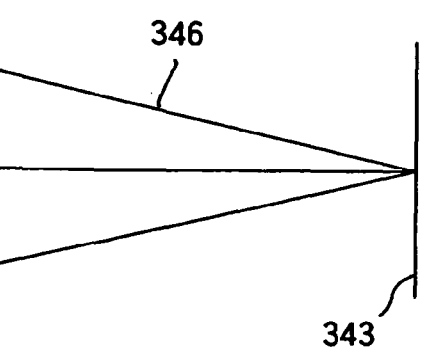
FIG.12 (c)

| PARALLAX NUMBER | 3-D PIXEL NUMBER | | ZONE WIDTH | LCD SUB-PIXEL NUMBER | |
|---|---|---|---|---|---|
| | START (LEFT END) | FINISH (RIGHT END) | | START (LEFT END) | FINISH (RIGHT END) |
| -15 | 2 | 8 | 7 | 13 | 121 |
| -14 | 2 | 36 | 35 | 14 | 626 |
| -13 | 2 | 63 | 62 | 15 | 1113 |
| -12 | 2 | 91 | 90 | 16 | 1618 |
| -11 | 2 | 119 | 118 | 17 | 2123 |
| -10 | 2 | 147 | 146 | 18 | 2628 |
| -9 | 1 | 174 | 174 | 1 | 3115 |
| -8 | 1 | 202 | 202 | 2 | 3620 |
| -7 | 1 | 230 | 230 | 3 | 4125 |
| -6 | 1 | 258 | 258 | 4 | 4630 |
| -5 | 1 | 285 | 285 | 5 | 5117 |
| -4 | 1 | 313 | 313 | 6 | 5622 |
| -3 | 1 | 320 | 320 | 7 | 5749 |
| -2 | 1 | 320 | 320 | 8 | 5750 |
| -1 | 1 | 320 | 320 | 9 | 5751 |
| 1 | 1 | 320 | 320 | 10 | 5752 |
| 2 | 1 | 320 | 320 | 11 | 5753 |
| 3 | 1 | 320 | 320 | 12 | 5754 |
| 4 | 8 | 320 | 313 | 139 | 5755 |
| 5 | 36 | 320 | 285 | 644 | 5756 |
| 6 | 63 | 320 | 258 | 1131 | 5757 |
| 7 | 91 | 320 | 230 | 1636 | 5758 |
| 8 | 119 | 320 | 202 | 2141 | 5759 |
| 9 | 147 | 320 | 174 | 2646 | 5760 |
| 10 | 174 | 319 | 146 | 3133 | 5743 |
| 11 | 202 | 319 | 118 | 3638 | 5744 |
| 12 | 230 | 319 | 90 | 4143 | 5745 |
| 13 | 258 | 319 | 62 | 4648 | 5746 |
| 14 | 285 | 319 | 35 | 5135 | 5747 |
| 15 | 313 | 319 | 7 | 5640 | 5748 |

THREE-DIMENSIONAL IMAGE DISPLAY DEVICE AND THREE-DIMENSIONAL IMAGE DISPLAY METHOD

BACKGROUND OF THE INVENTION

1. Field of the Invention

The present invention relates to a three-dimensional image display device and a display method.

2. Related Art

There are various known systems for stereoscopic image display devices or so-called three-dimensional display devices that can display moving images. In recent years, there is an increasing demand for flat-panel type devices that do not require any special tools such as glasses. One of the systems that can be easily realized is a system in which an optical plate for directing the light rays from a display panel (an elemental image display unit) toward a viewer is placed in front of the display panel of a device such as a liquid crystal display device or a plasma display device of a direct-vision type or a projection type having the pixel positions fixed therein.

An optical plate is generally called a parallax barrier, and controls light rays so that different images can be seen from the same position on the optical plate at different angles. More specifically, in a case where only transverse parallaxes (horizontal parallaxes) are provided, slits or a lenticular sheet (a cylindrical lens array) is employed. In a case where vertical parallaxes are also provided, a pinhole array or a lens array is employed. The systems utilizing parallax barriers include the binocular system, the multi-viewpoint system, the super multi-viewpoint system (the multi-viewpoint system involving a very large number of viewpoints), and the integral photography (hereinafter referred to as IP). The basic principles of those systems are substantially the same as those developed a hundred years ago and used for stereoscopic photography.

In the IP system or the multi-viewpoint system, the viewing distance is normally limited, and therefore, an image to be displayed is formed so that the perspective projection image at the viewing distance can be actually seen. In the IP system provided only with horizontal parallaxes (the one-dimensional IP system), there are combinations of parallel light rays where the horizontal pitch of the parallax barrier is equivalent to an integral multiple of the value of the horizontal pitch of sub-pixels of the elemental image display unit (this system will be hereinafter referred to also as the parallel-ray one-dimensional IP). Therefore, images that are perspective projection images at a constant viewing distance in the vertical direction and are orthographic projection images in the horizontal direction are divided into the images of the respective pixel columns, and the divided images are combined to form a parallax interleaved image in the image format to be displayed in the display plane. In this manner, a correctly projected three-dimensional image can be obtained. The specific procedures are disclosed in SID04 Digest 1438 (2004). In the multi-viewpoint system, an image formed through a simple perspective projection is divided and rearranged, so as to obtain a correctly projected three-dimensional image.

An image pick-up device that utilizes different projecting methods and different projection center distances between the vertical direction and the horizontal direction is difficult to produce, because cameras or lenses of the same size as the object to be displayed are required, especially in a orthographic projecting operation. Therefore, to achieve orthographic projection data through an image pick-up operation, conversion of the image pick-up data of a perspective projection image is more realistic. For example, a light-ray space method or the like by which interpolations utilizing an EPI (epipolar plane) are performed is well known.

As disclosed in SID04 Digest 1438 (2004), the parallel-ray one-dimensional IP system has a wider viewing zone and more continuous motion parallaxes than the binocular system and the multi-viewpoint system. Accordingly, in the parallel-ray one-dimensional IP system, images can be easily viewed, without a feeling of discomfort.

Since the binocular system and the multi-viewpoint system are the simplest three-dimensional image display systems, the image formats are also simple, and all viewpoint images have the same sizes. Two parallax components images in a binocular case and nine parallax components images in a nine-viewpoint case are divided into images of the respective pixel columns, and the divided images are combined to form a parallax interleaved image (elemental image array) in the image format to be displayed on the elemental image display unit. In the parallel-ray one-dimensional IP system, the number of parallax component images is larger than that in a multi-viewpoint system having the same resolution, and the sizes (the horizontal use ranges) of the parallax components images vary with the parallax directions. However, JP-A 2006-98779 (KOKAI) discloses that, in the parallel-ray one-dimensional IP system, tiling can be efficiently performed on the parallax component images in suitable combinations only in the necessary ranges, and the parallax components images can be converted, with high efficiency, into a format that causes little degradation at the time of non-reversed compression.

This parallax image array format is formed, with a predetermined viewing distance and a predetermined viewing zone being taken into consideration. However, there are cases where the viewing zone needs to be readjusted, due to a lens pitch error, a lens positioning error, a shift of lens positions, resetting of a virtual viewing distance, or the like. Particularly, in a case where content created for display devices of a certain screen size is reproduced by a display device of a different screen size, the virtual viewing distance changes with the scaling. As a result, broken (pseudoscopic) images are observed in the small regions at the left and right ends of the screen, or a defective image having a few vertical lines running through the image is observed. Creating the content again after such a problem is found results in inefficiency.

As described above, in a three-dimensional image display device of the conventional parallel-ray one-dimensional IP type, the problem of broken images is caused unless the viewing zone is readjusted for content created for a certain viewing distance and a certain viewing zone.

SUMMARY OF THE INVENTION

The present invention has been made in view of these circumstances, and an object thereof is to provide a three-dimensional image display device and a display method by which a viewing zone can be readily adjusted in the parallel-ray one-dimensional IP system, without a decrease in processing speed.

According to a first aspect of the present invention, there is provided a three-dimensional image display device including: an elemental image display unit that has pixels arranged in a matrix form in a display plane, and displays an elemental image; an optical plate that is placed to face the elemental image display unit, extends straightly in a vertical direction, and controls a light ray from the elemental image display unit, the optical plate having optical apertures arranged at intervals in a horizontal direction; and an image data converting unit that converts image data so as to replace missing image data with a neighboring parallax component in the same elemental image, based on the average width of elemental images in an input image data and the optimum average width of elemental images in a three-dimensional video image to be output.

According to a second aspect of the present invention, there is provided a three-dimensional image display method by which a three-dimensional image is displayed with the use of an elemental image display unit that has pixels arranged in a matrix fashion in a display plane, and displays an elemental image; and an optical plate that is placed to face the elemental image display unit, extends straightly in a vertical direction, and controls a light ray from the elemental image display unit, the optical plate having optical apertures arranged at intervals in a horizontal direction, the method including converting image data so as to replace missing image data with a neighboring parallax component in the same elemental image, based on the average width of elemental images in an input image data and the optimum average width of elemental images in a three-dimensional video image to be output.

BRIEF DESCRIPTION OF THE DRAWINGS

FIG. 7 shows a format to be used by the three-dimensional image display device according to the embodiment;

FIG. 8 shows an all-image-combined format to be used by the three-dimensional image display device according to the embodiment;

FIGS. 12(a), 12(b), and 12(c) are schematic views showing the relationships among the elemental image pitch, the parallax barrier pitch, the parallax barrier distance, the viewing distance, and the viewing zone;

FIG. 14 shows the data ranges of parallax component images and the locations of the parallax components images in a parallax interleaved image;

DETAILED DESCRIPTION OF THE INVENTION

The following is a description of a three-dimensional image display device as an embodiment of the present invention, with reference to the accompanying drawings.

Figure 1:
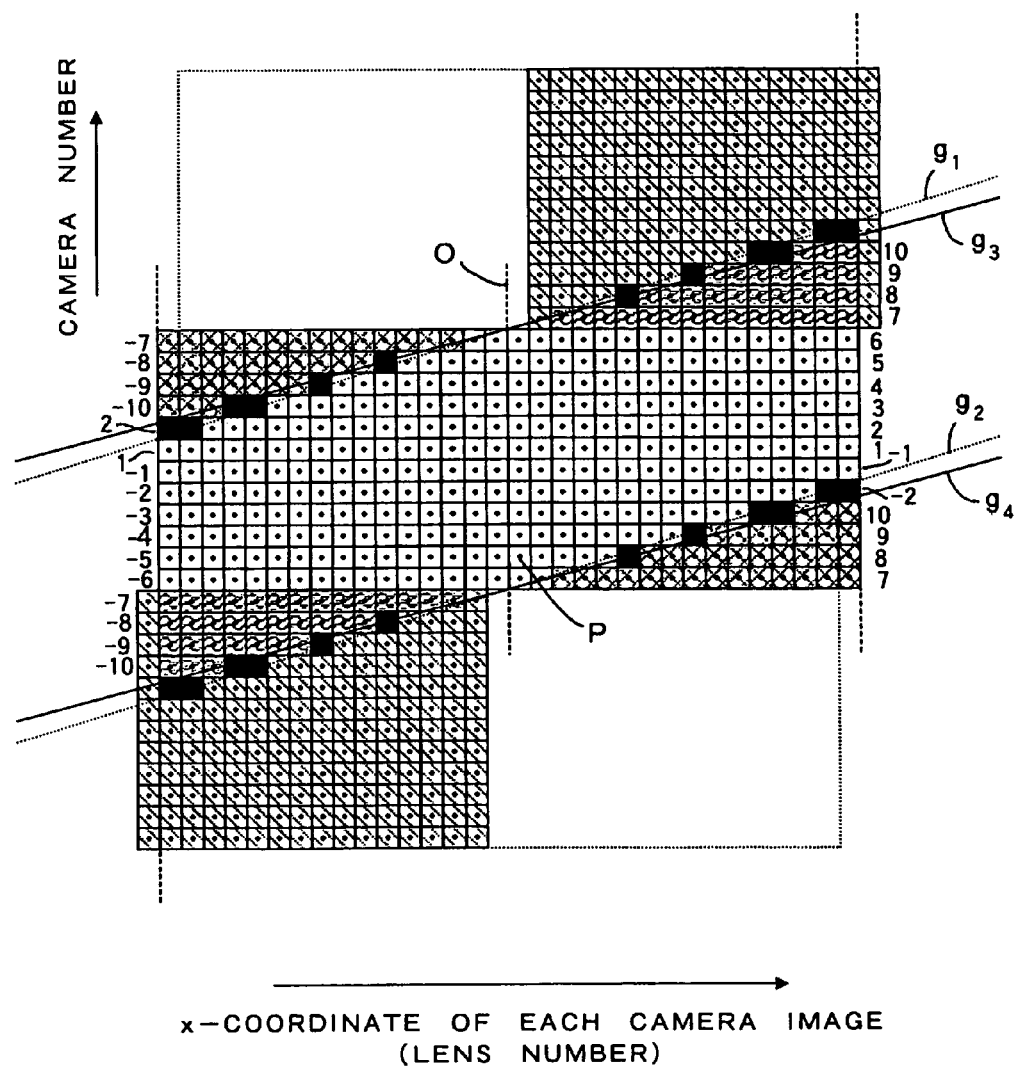
FIG. 1 is a schematic view showing a data space to be used in a three-dimensional image display device according to an embodiment.

FIG. 1 is a conceptual diagram showing a data space for illustrating an image conversion method to be utilized in a three-dimensional image display device of a one-dimensional IP type in accordance with an embodiment of the present invention. The data space shown in FIG. 1 is substantially equivalent to a generally-known light field or ray space (EPI). In FIG. 1, the abscissa axis indicates the x-coordinate of each camera image (the lens number (the number allotted to each elemental image)), and the ordinate axis indicates the camera number. The numbers allotted on both sides in the ordinate direction are parallax numbers. Each one rectangle (having a dot in its center) P represents one pixel data of a parallax component image (a camera image). One pixel data P is shown as a data space only for one value on the vertical-direction coordinate (y-coordinate) of a camera image. More specifically, all the pixel data shown in FIG. 1 represent the camera images on the same y-coordinate. In FIG. 1, the parallax number is 12. In the case of a parallel-ray one-dimensional IP type, a parallelogram defined by two solid diagonal lines. $g_1$ and $g_2$ representing the viewing boundaries is used, the number of cameras is larger than 12, and the cameras have different x-coordinate ranges from one another.

Figure 2A:
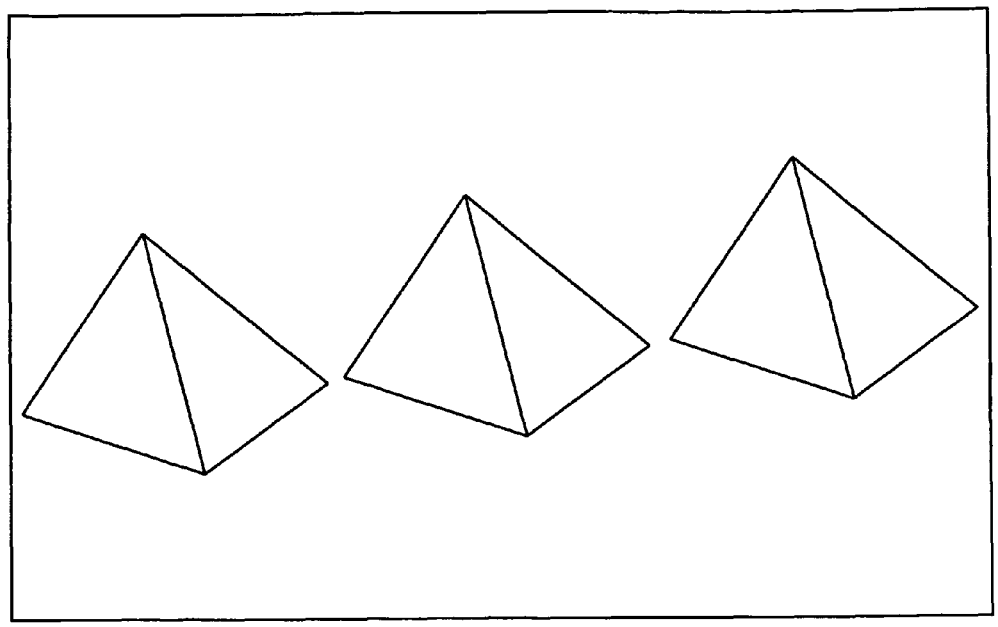
FIGS. 2A and 2B are conceptual diagrams showing three-dimensional images formed by the three-dimensional image display device according to the embodiment.
Figure 2B:
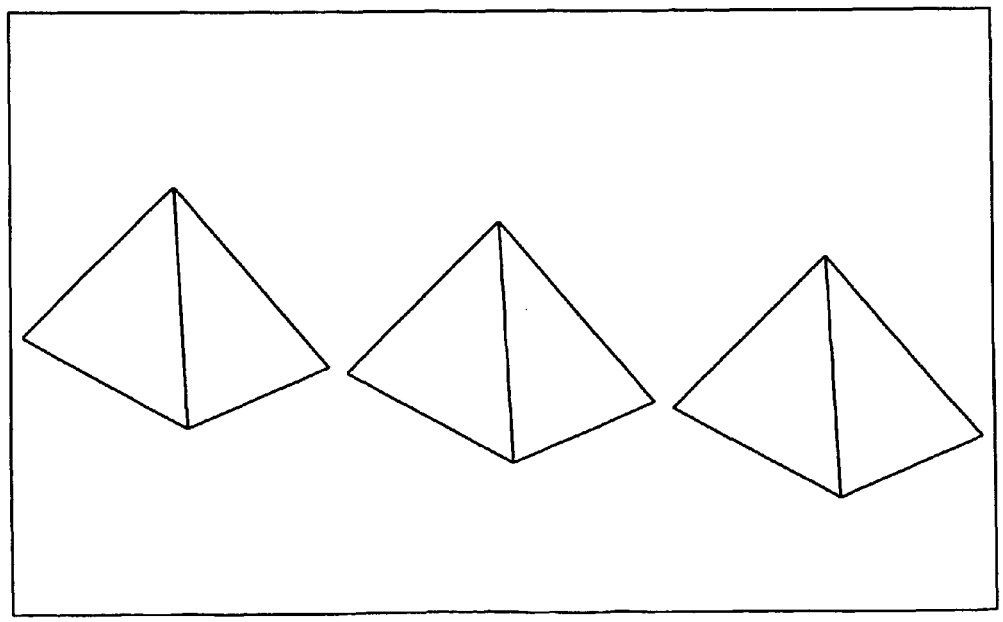
Figure 3A:
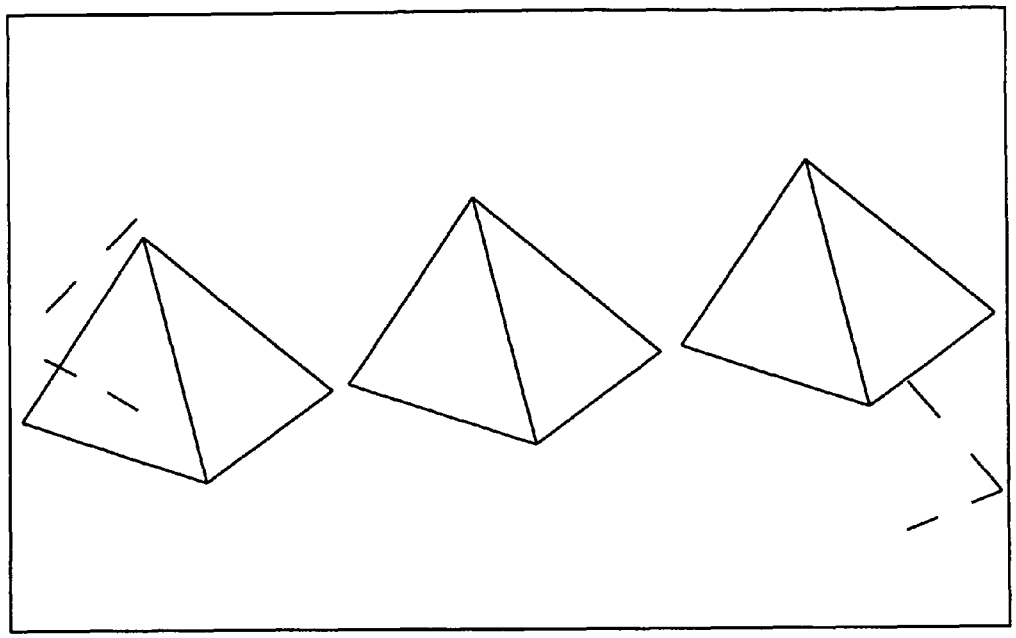
FIGS. 3A and 3B are conceptual diagrams showing broken images formed by a three-dimensional image display device of a one-dimensional IP type as a comparative example.
Figure 3B:
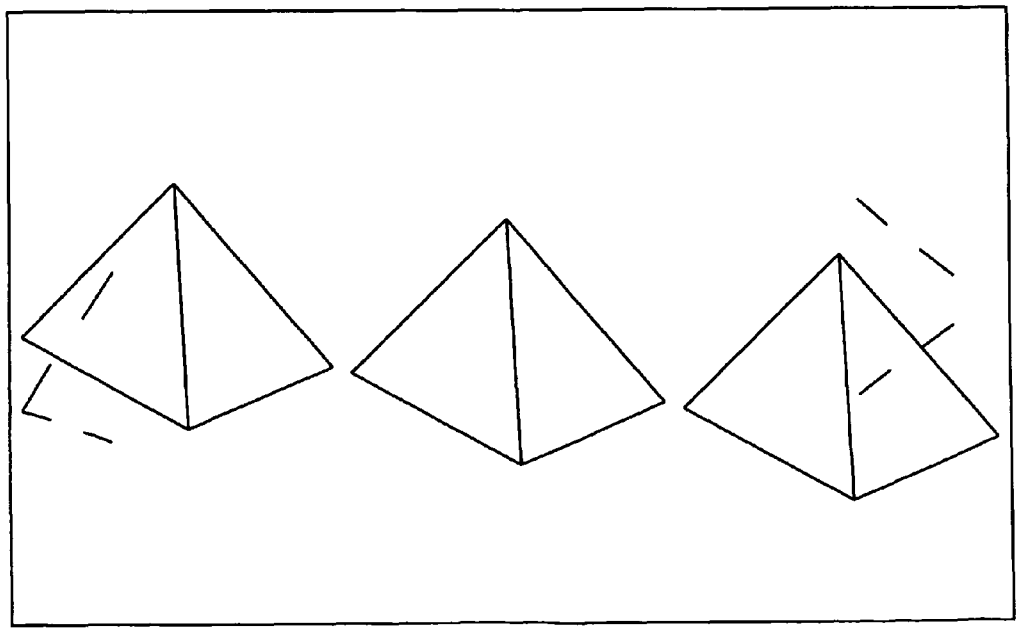

Referring now to FIGS. 2A through 3B, broken (pseudoscopic) images are described. FIGS. 2A and 2B are conceptual diagrams of normal three-dimensional images formed by the three-dimensional image display device of the one-dimensional IP type according to the embodiment, seen from the left end and the right end of a viewing zone. FIGS. 3A and 3B show examples of broken images that are seen in the vicinities of both ends of images, where video content produced on the basis of a predetermined viewing distance and a predetermined viewing zone is reproduced or observed at a different viewing distance from the predetermined viewing distance and in a different viewing zone from the predetermined viewing zone. In this case, partially overlapped images of the original images shown in FIGS. 2A and 2B appear in longitudinal regions. Such broken images at both ends of each image may be seen from the center of a viewing zone.

To prevent appearance of broken images when original images are reproduced or observed under different conditions from the original conditions, the solid diagonal lines $g_1$ and $g_2$ representing the viewing boundaries should be changed to diagonal lines $g_3$ and $g_4$ having different gradients from the diagonal lines $g_1$ and $g_2$ in the data space of FIG. 1. The gradient of a straight line representing a viewing boundary is proportional to (average width of elemental images−(parallax number×sub pixel width)). However, in a case where a viewing distance and a viewing zone are preset and the data of each camera image exists only in a minimum x-coordinate range, when the lines representing the viewing boundaries are changed, data missing is caused. In FIG. 1, the pixels in black represent the missing data. The missing data are replaced with duplicates of the pixels of neighboring cameras in the same elemental image (having the same x-coordinate and the same lens number in the data space), so as to maintain the continuity in the image in the viewing zone. In such a case, as the missing data is replaced with the neighboring parallax data, the corresponding portions of the image become two-dimensional from three-dimensional. However, the portions are merely small regions in the vicinities of the viewing boundaries or the end portions of the screen, and accordingly, there is no feeling of discomfort at the time of viewing.

Figure 4:
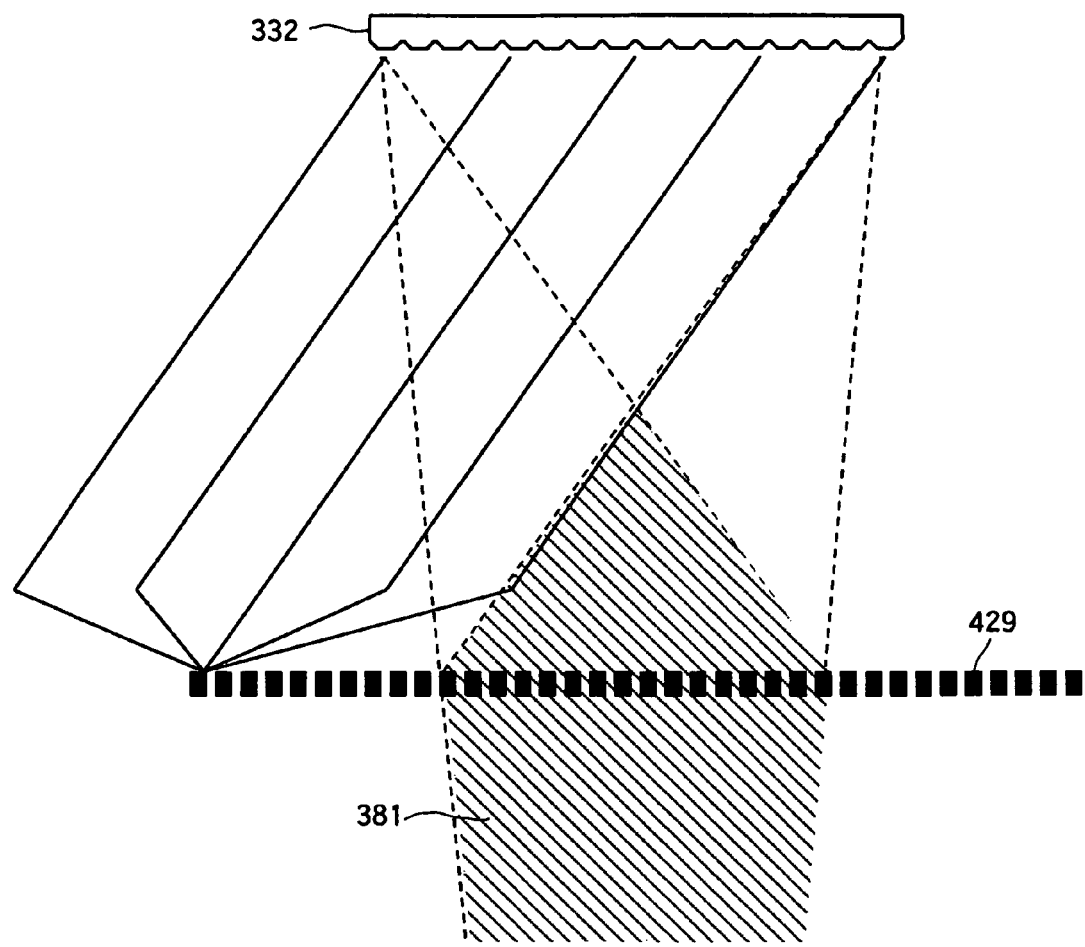
FIG. 4 is a conceptual view showing an example of a viewing zone set by the three-dimensional image display device according to the embodiment.
Figure 5:
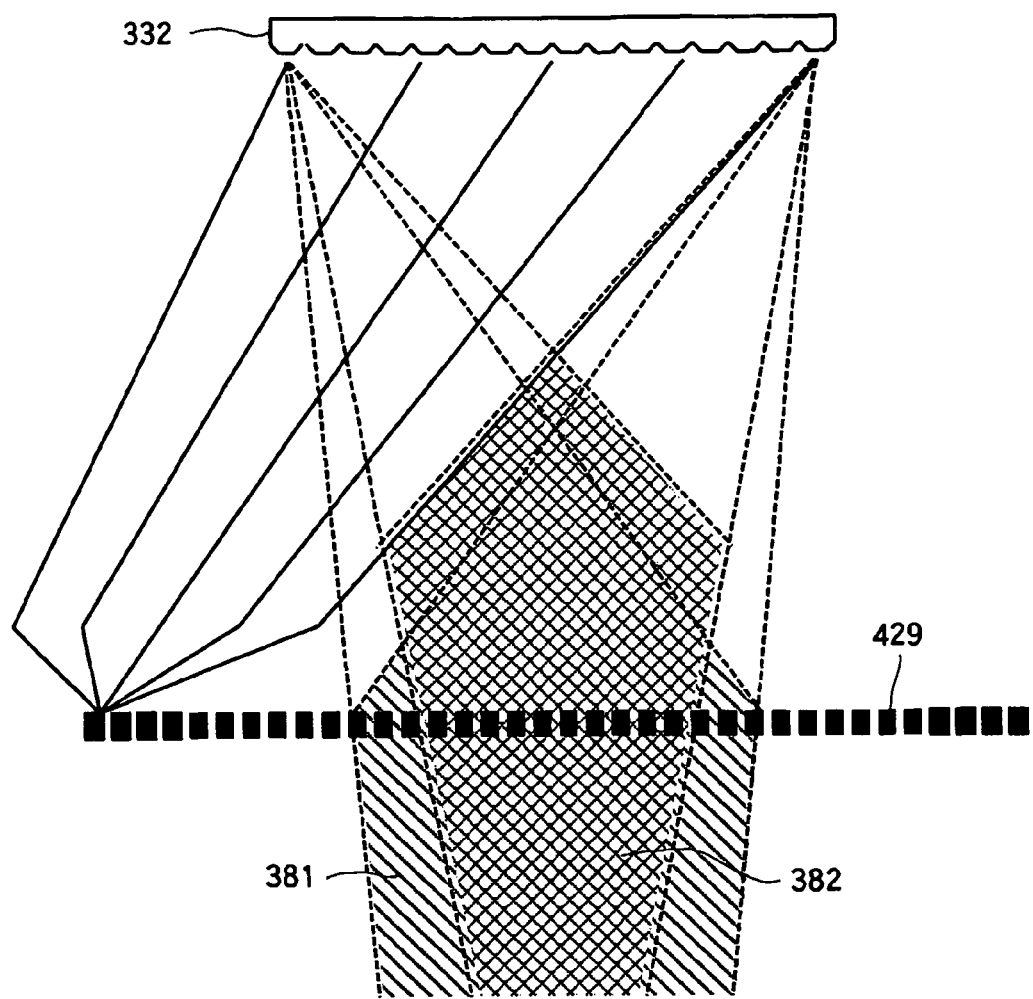
FIG. 5 is a conceptual view showing an example of a viewing zone set by the three-dimensional image display device according to the embodiment.

FIG. 4 is a conceptual view showing an example of a viewing zone set by the three-dimensional image display device of the one-dimensional IP type according to the embodiment. In FIG. 4, a viewing zone 381 is preset. In FIG. 4, reference numeral 332 indicates an optical plate (a parallax barrier), and reference numeral 429 indicates cameras. FIG. 5 is a conceptual view showing an example of a viewing zone set by the three-dimensional image display device of the one-dimensional IP type according to the embodiment. FIG. 5 shows an example case where the lens pitch of a lenticular plate that is the optical plate 332 slightly varies (becomes shorter if the lenticular plate is located in front of the elemental image display unit), and the viewing zone 381 and the optimum viewing distance (the viewing distance at which the viewing zone becomes widest) also vary. Here, the viewing zone 381 changes into a viewing zone 382. To adjust the viewing zone 382 to the original viewing zone 381, the average width of elemental images needs to be slightly smaller. Accordingly, in the data space shown in FIG. 1, the diagonal lines representing the viewing boundaries are moved to slightly reduce the degree of inclination with respect to the center point O of the data space, and the missing portions in the parallelogram (the upper left portion and the lower right portion of the parallelogram) are replaced with a portion inside each column (a portion having a camera number closer to the center of the viewing zone). To view the image from a shorter viewing distance without a broken image in the case of FIG. 4, the average width of elemental images needs to be slightly larger. In this case, in the data space shown in FIG. 1, the diagonal lines representing the viewing boundaries are moved to slightly increase the degree of inclination with respect to the center point O of the data space, and the missing portions in the parallelogram (the upper right portion and the lower left portion of the parallelogram) are replaced with a portion inside each column (a portion having a camera number closer to the center of the viewing zone). If data missing is caused near the end portions of the screen (both ends in the x-coordinate in the data space), the missing data might be the data of two or more cameras. In such a case, the missing data should also be replaced with a portion of inside each column (a portion having a camera number closer to the center of the viewing zone).

Figure 6:
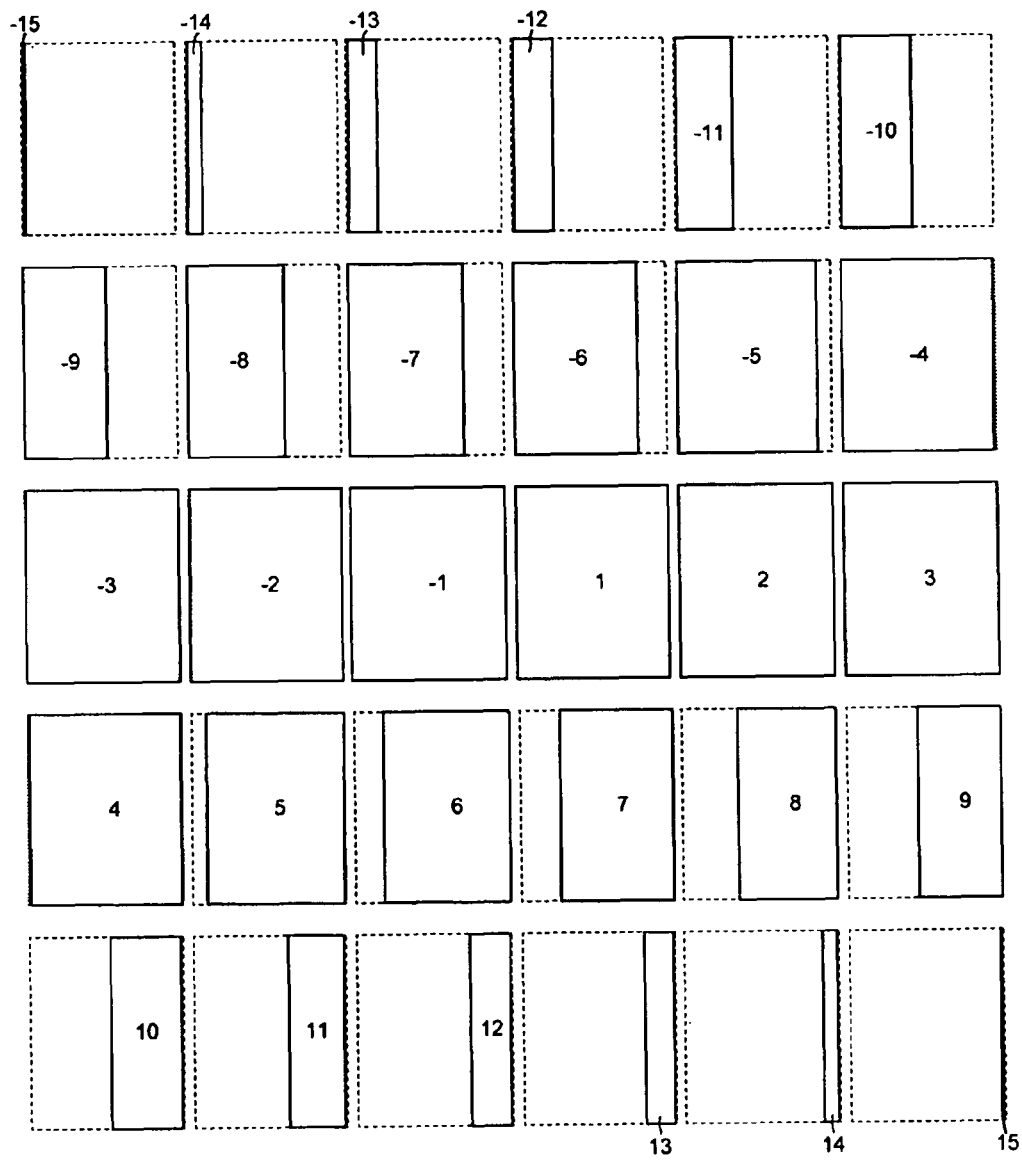
FIG. 6 shows each parallax component image to be used by the three-dimensional image display device according to the embodiment.
Figures 7, 8:
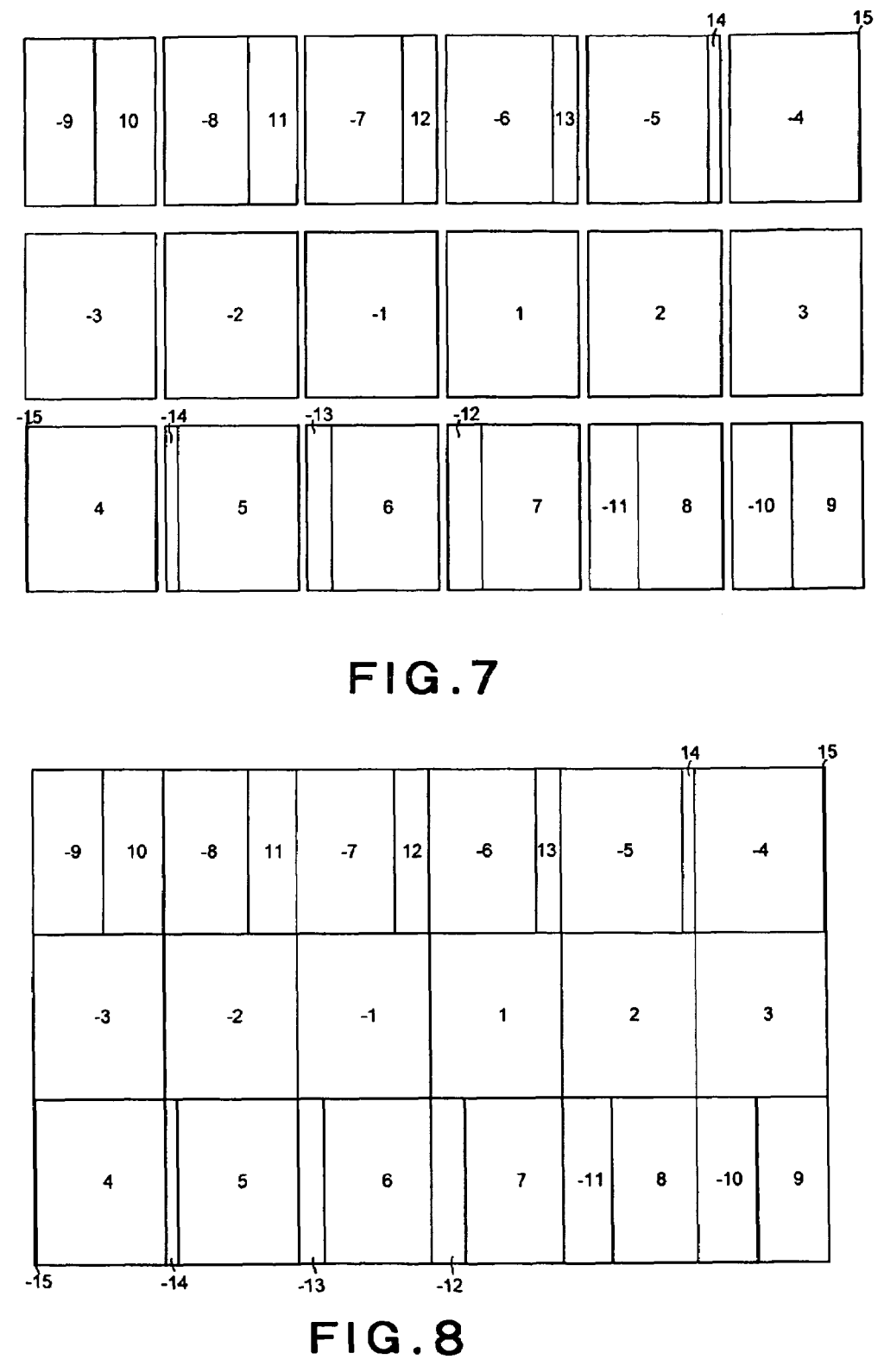

FIG. 6 shows each parallax component image to be used by the three-dimensional image display device of the one-dimensional IP type according to the embodiment. FIG. 6 shows examples of the shapes of the use ranges of parallax component images in a case where the parallax number is 18 and the camera number is 30. The numbers shown in FIG. 6 are the parallax numbers corresponding to the respective parallax component images. Each region indicated by solid lines represents the data to be used for displaying a three-dimensional image of a parallax component image, and each region indicated by broken lines represents the data not to be used for displaying a three-dimensional image of a parallax component image. As in the example case shown in FIG. 1 where the parallax number is 12, the cameras have different use ranges from one another. However, if the use ranges of each two images allotted with camera numbers different by the same value as the parallax number are combined, eighteen images of the same size are obtained as shown in FIG. 7. FIG. 7 shows a format to be used by the three-dimensional image display device of the one-dimensional IP type according to the embodiment, where the parallax component images are combined. For example, the use ranges of the images having each of the combinations of camera numbers (−9, 10), (−8, 11), (−7, 12), (−6, 13), (−5, 14), (−4, 15), (−15, 4), (−14, 5), (−13, 6), (−12, 7), (−11, 8), and (−10, 9) should be combined. Further, as shown in FIG. 8, the eighteen images can be combined into one format, so as to form a combined image of all the parallax component images. The combined image has the same size as the ultimate image of the elemental images to be displayed on the display unit. Such a method of combining parallax component images is disclosed in JP-A 2006-98779 (KOKAI). The section obtained by cutting a stack of the same number of combined images as the parallax number as shown in FIG. 7 along a predetermined y-coordinate plane is equivalent to the diagram shown in FIG. 1.

Accordingly, in a case where the viewing zone is not to be adjusted, each pixel in the format of the combination of all the images shown in FIG. 8 is converted into a pixel in the ultimate display format (a parallax interleaved image or an elemental image array). FIG. 8 shows an all-image-combined format to be used by the three-dimensional image display device of the one-dimensional IP type according to the embodiment, where all the parallax component images are combined. However, in a case where the viewing zone shown in FIGS. 4 and 5 is to be adjusted as in this embodiment, the pixels existing between the viewing boundaries before and after the adjustment are not converted in the one-to-one pixel converting (mapping) operation, but the neighboring pixel data on the same column (in the same elemental image) is converted instead. In this manner, a viewing-zone-adjusted image is generated. Here, each one piece of the neighboring pixel data corresponds to two or more pieces of pixel data. The three-dimensional image display device of this embodiment has an image data converting unit that performs such an image data converting operation. In a case where the one-to-one pixel conversion is performed with the use of a map showing the correspondence among pixels before and after the conversion (a conversion table), the map is simply switched when the device operation changes from a regular display operation to a viewing-zone adjusting operation. In this manner, the processing load is not increased by the viewing zone adjusting operation.

Figure 9A:
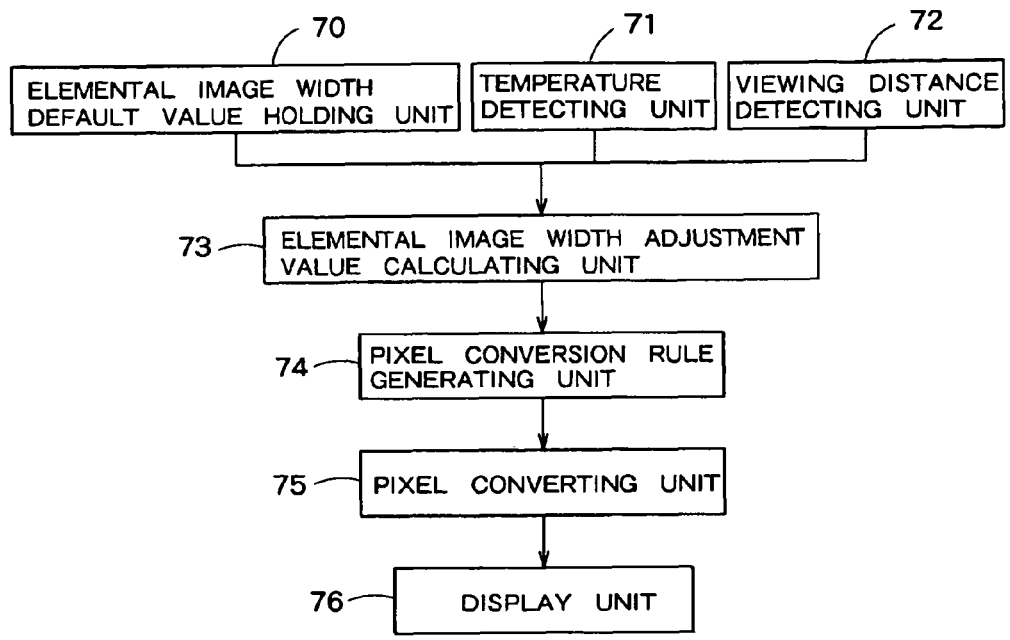
FIGS. 9A and 9B illustrate the viewing zone adjusting operation to be performed by the image data converting unit of the three-dimensional image display device.
Figure 9B:
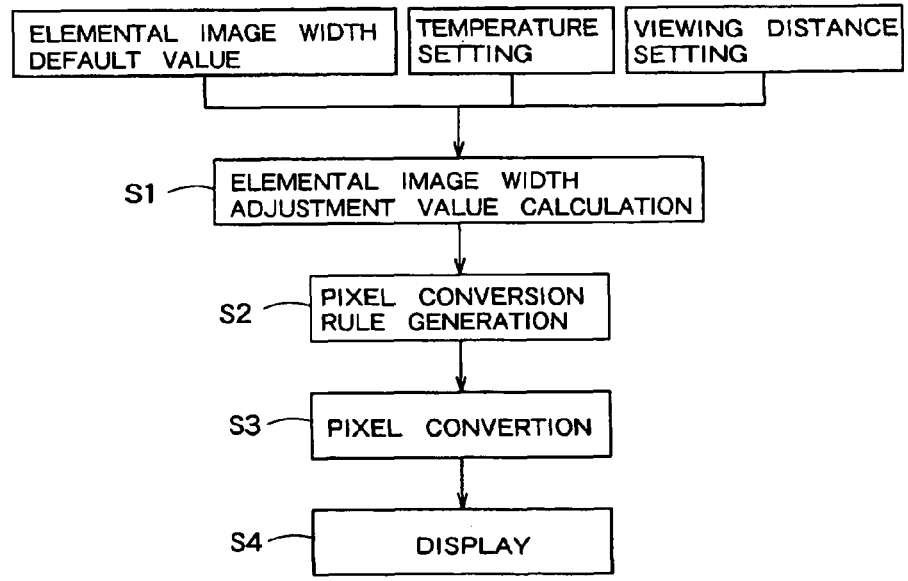

FIG. 9A is a block diagram of the image data converting unit of the three-dimensional image display device in, accordance with this embodiment. FIG. 9B is a flowchart of the viewing-zone adjusting operation (a display method) to be performed by the image data converting unit. As shown in FIGS. 9A and 9B, the viewing-zone adjusting operation of the image data converting unit is performed by an elemental image width adjustment value calculating unit 73 that calculates the adjustment value of the average width of elemental images or the optimum average width of elemental images for an output three-dimensional video image (step 1). The adjustment value of the average width is calculated based on an elemental image default value that is held by an elemental image default value holding unit 70, a temperature that is detected by a temperature detecting unit 71 in the vicinity of the elemental image display unit, and a viewing distance of a viewer that is detected by a viewing distance detecting unit 72. Based on the calculated adjustment value of the average width of elemental images, an image conversion rule generating unit 74 generates conversion rules (a pixel correspondence map or a conversion table) (step S2). In accordance with the map or the like, a pixel converting unit 75 converts the pixel of an input image (step S3). The converted image having the ultimate display format (a parallax interleaved image or an elemental image array) is sent to an elemental image display unit 76, which displays the converted image (step S4).

As described above, in a case where the average width of the elemental images in input image data is different from the average width of the elemental images in a three-dimensional video image to be output in this embodiment, image data conversion is performed so that missing image data is replaced with the neighboring parallax components in the same elemental image.

In the image data converting operation, some pixels in an input multi-viewpoint image are not converted, but a selective converting operation is performed to convert some pixels at two or more locations. In this manner, the pixels are converted into an image in the display format of the elemental image display unit.

Also, in a format in which input multi-viewpoint images are arranged in a tile-like fashion, some pixels are not converted, but a selective converting operation is performed to convert some pixels at two or more locations. In this manner, pixels are converted into an image in the display format of the elemental image display unit.

The optical aperture of the optical plate of the three-dimensional video display of this embodiment may not be vertical, but may have a diagonal, zigzag, or step-like shape. Also, the pixel arrangement on the display device may be a delta arrangement. In any of those cases, the viewing zone can be adjusted by a simple procedure in accordance with the method of this embodiment.

Referring now to FIGS. 10A through 22, a three-dimensional video display operation utilizing an IP-type parallax image arrangement is described. The three-dimensional image display operation shown in FIGS. 10A through 22 is embodied in combination with the display method that has been described with reference to FIGS. 1 through 9B. Here, an example case where the parallax number is 18 is described.

Figure 10A:
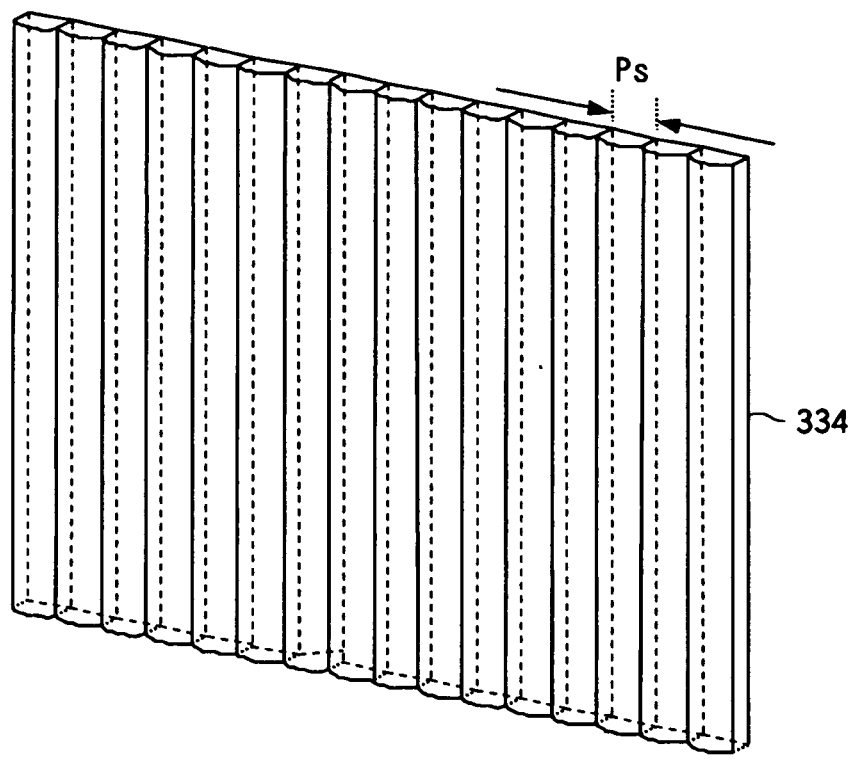
FIGS. 10A and 10B are schematic perspective views of optical plates according to the embodiment.
Figure 10B:
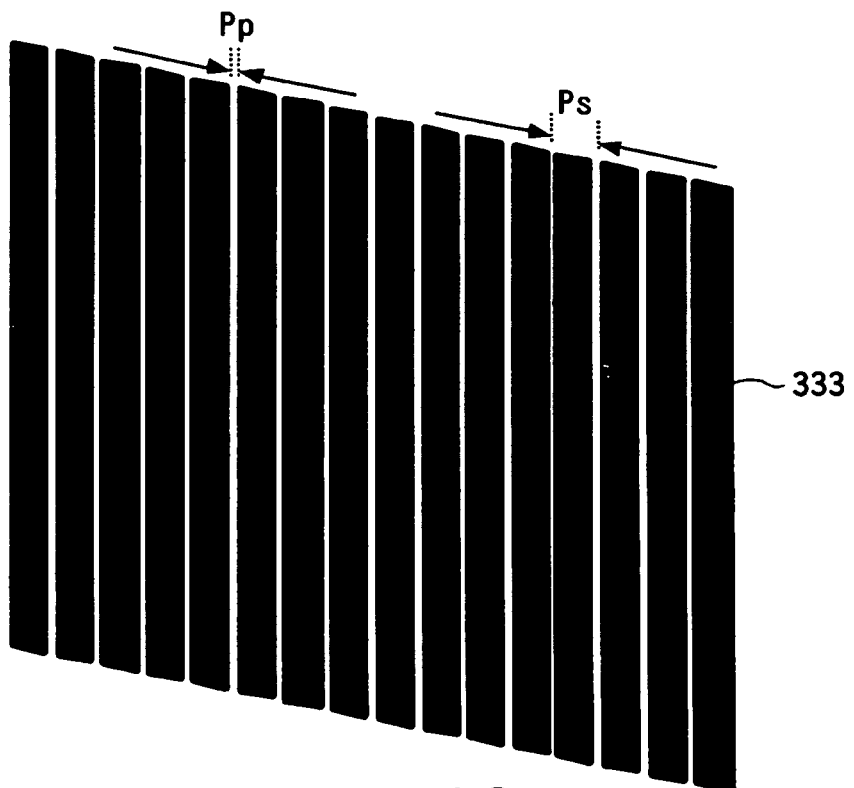

FIG. 10A is a perspective view of a lenticular sheet 334 as an optical plate, and FIG. 10B is a perspective view of a slit array 333 forming an optical plate. In FIGS. 10A and 10B, Ps indicates the parallax barrier pitch, and Pp indicates the pixel pitch of the elemental image display unit.

Figure 11:
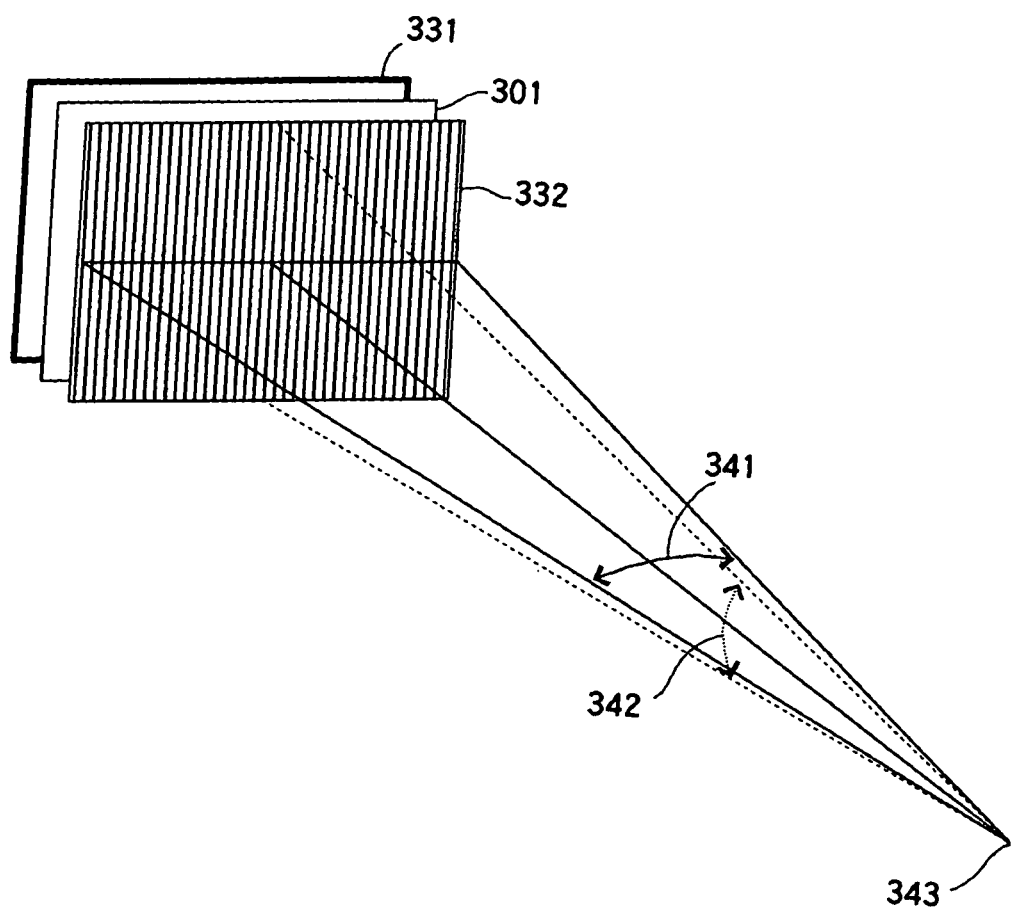
FIG. 11 is a schematic perspective view of a three-dimensional image display device to be used for displaying a three-dimensional image.

FIG. 11 schematically illustrates the structure of the three-dimensional image display device. In this structure, a diffusion sheet 301 is provided between the elemental image display unit 331 and the lenticular plate (optical plate) 332, if necessary. When seen from a viewpoint 343 at a standard viewing distance, a three-dimensional image is observed within a range defined by a horizontal viewing angle 431 and a vertical viewing angle 342. However, the parallaxes are limited to the horizontal direction.

FIGS. 12(a), 12(b), and 12(c) are schematic development views showing the light-ray reproducing range in a vertical plane and a horizontal plane, with the display unit of the three-dimensional image display device shown in FIG. 11. FIG. 12(a) is a front view of the elemental image display unit 331 and the parallax barrier 332. FIG. 12(b) is a plan view showing an image arrangement of the three-dimensional image display device. FIG. 12(c) is a side view of the three-dimensional image display device. As shown in FIGS. 11 through 12(c), the three-dimensional image display device includes a flat image display unit (the elemental image display unit) 331 such as a liquid crystal display device and the optical plate 332 having optical apertures. As shown in FIGS. 10A and 10B, the optical apertures extending in a straight line in the vertical direction are formed with the lenticular sheet 334 or the slit array 333 arranged at regular intervals in the horizontal direction. In a case of a projection type display unit, the optical apertures are formed with a curved mirror array or the like.

In this three-dimensional image display device, a three-dimensional image can be observed on the front side and the back side of the optical plate 332, as the display device 331 is viewed from the viewing point 343 via the parallax barrier 332 in the range defined by the horizontal viewing angle 341 and the vertical viewing angle 342. Here, the number of pixels of the elemental image display unit 331 is 1920 in the transverse direction (the horizontal direction) and 1200 in the longitudinal direction (the vertical direction) in an example case where one pixel unit is the smallest unit in the square form. Each of the smallest-unit pixels contains sub pixels of red (R), green (G), and blue (B).

In FIGS. 12(a), 12(b), and 12(c), the viewing distance L between the parallax barrier 332 and the viewing plane 343, the parallax barrier pitch Ps, and the distance d between the parallax barrier 332 and the elemental image display unit 331 (the parallax barrier distance) are defined so as to determine the elemental image pitch Pe based on the intervals at which the aperture centers are projected on the display device from the viewing point in the viewing distance plane 343. Reference numeral 346 indicates the line connecting the viewing point and each aperture center. The viewing zone width W is set so that the elemental images do not overlap with one another on the pixel plane of the display unit 331.

By the one-dimensional IP method, the straight line 346 does not necessarily pass through the center of each sub pixel on the display face of the display unit 331. By a multi-viewpoint method, on the other hand, the line connecting the viewing point and the center of each aperture passes through the center of each sub pixel, and is equivalent to the light ray trajectory. In a case where the horizontal pitch Ps of the apertures is an integral multiple of the sub pixel pitch Pp, the elemental image pitch Pe is an integral multiple of the sub pixel pitch Pp plus a fraction. Even if the horizontal pitch Ps of the apertures is not an integral multiple of the sub pixel pitch Pp, the elemental image pitch Pp is generally an integral multiple of the sub pixel pitch Pp plus a fraction by the one-dimensional IP method. By the multi-viewpoint method, on the other hand, the elemental image pitch Pe is an integral multiple of the sub pixel pitch Pp.

Figure 13A:
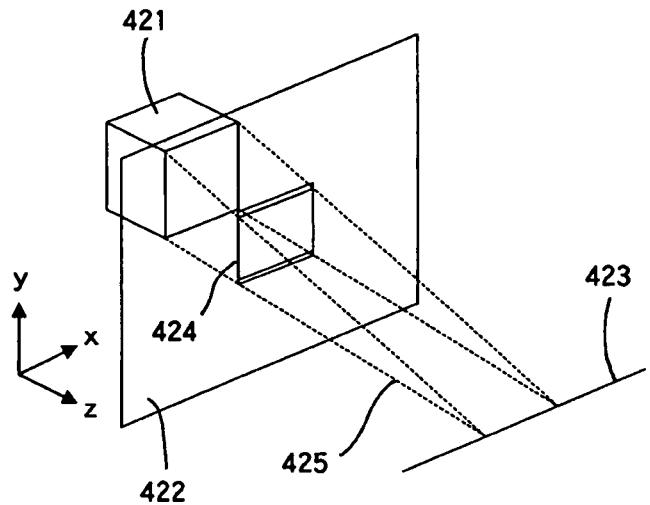
FIGS. 13A and 13B are schematic diagrams illustrating the projection method of parallax component images according to the embodiment.
Figure 13B:
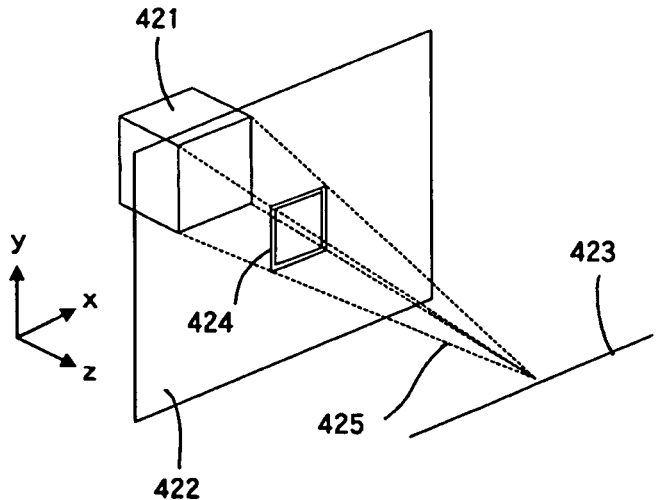

FIGS. 13A and 13B illustrate a method of forming a parallax component image and a three-dimensional image by the one-dimensional IP method in accordance with one embodiment of the present invention. An object 421 to be displayed is projected on a projection face 422 located in the same position as the face on which the optical plate of a three-dimensional image display device is placed. To obtain a three-dimensional image without a distortion, the image is projected along projection lines 425 extending toward a projection center line 423 that is parallel to the projection face, is located in front of the projection face (at the center in the vertical direction), and exists in the viewing distance plane, so that perspective projection is performed in the vertical direction while orthographic projection is performed in the horizontal direction, as shown in FIG. 13A. The projection lines 425 cross in the vertical direction on the projection center line 423, but do not cross in the horizontal direction. By this projection method, an image 424 of the object 421 is formed on the projection face 422. In a case where a three-dimensional image distorted so as to emphasize the stereoscopic effect, the image is projected along projection lines 425 extending to one point (the camera position) on the projection center line 423 that is parallel to the projection face 422, is located in front of the projection face 422 (at the center in the vertical direction), and exists in the viewing distance plane, so that regular perspective projection is performed, as shown in FIG. 13B. By this method, an image 424 of the object 421 is formed on the projection face 422. In a case where it is highly necessary to restrain distortions in the three-dimensional image but only regular perspective projection can be performed, this projection method should be utilized after a CG model is deformed. Inversely proportional deformation is performed in the z-direction (the depth direction), with a near region, which is a region between an observer and a surface of the optical plate nearest to the observer, in the x-direction being reduced and a far region, which is a region beyond a surface of the optical plate furthest from the observer, in the x-direction being increased.

There need to be several tens of projecting directions in accordance with the viewing distance. In a case where the viewing distance is 1000 mm and the parallel-ray one-dimensional IP method is utilized, the elemental image width is 18.036 of the sub pixel width. In this case, the number of cameras is thirty. The projected image (a parallax component image) should be formed only on the columns in the necessary range, which is shown in FIGS. 6 and 14. The projecting directions correspond to the parallax numbers (the camera numbers). The projection directions are not arranged at regular angles, but are at regular intervals in the viewing distance plane. Accordingly, the cameras are moved in parallel and at regular intervals on the projection center line.

Figure 15:
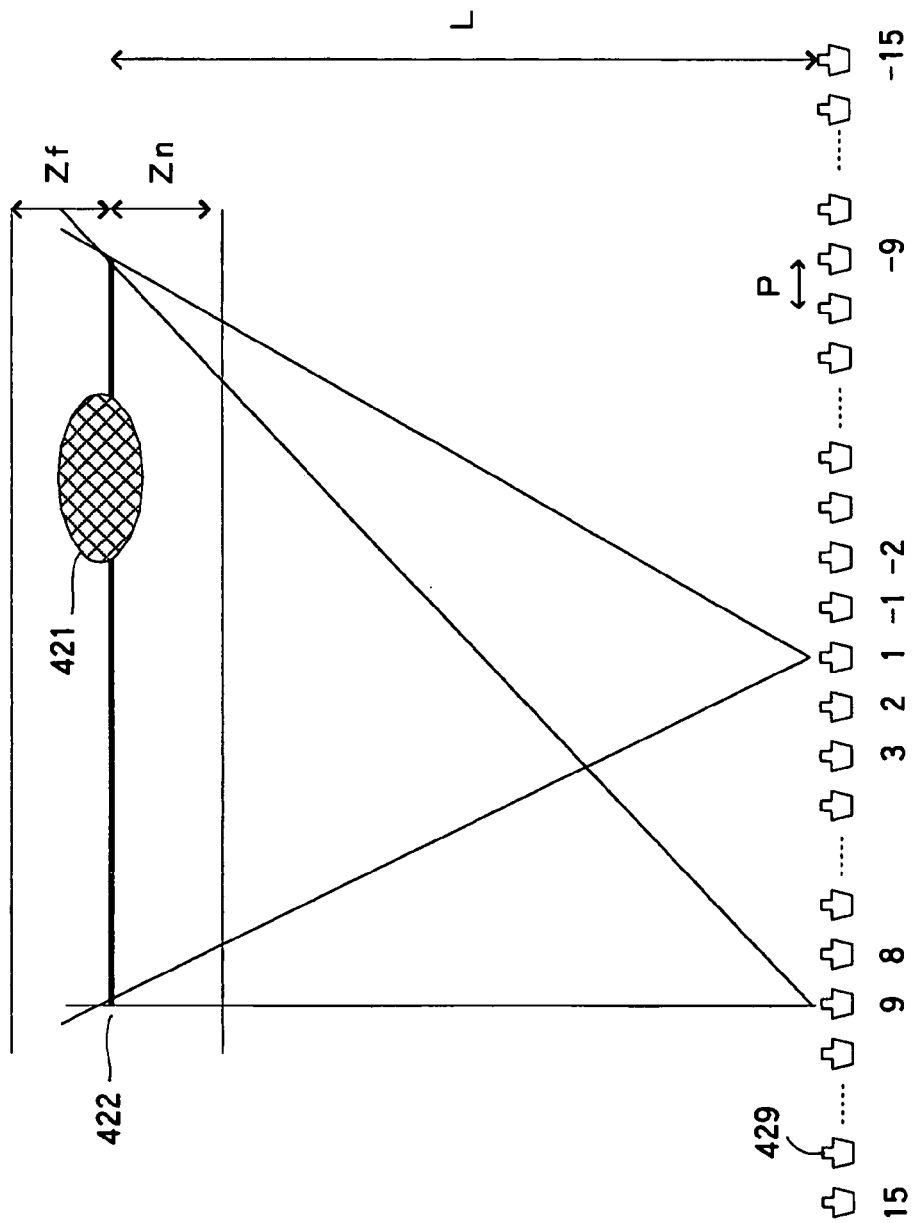
FIG. 15 is a plan view showing the camera arrangement by a three-dimensional image display method according to an embodiment.
Figure 16:
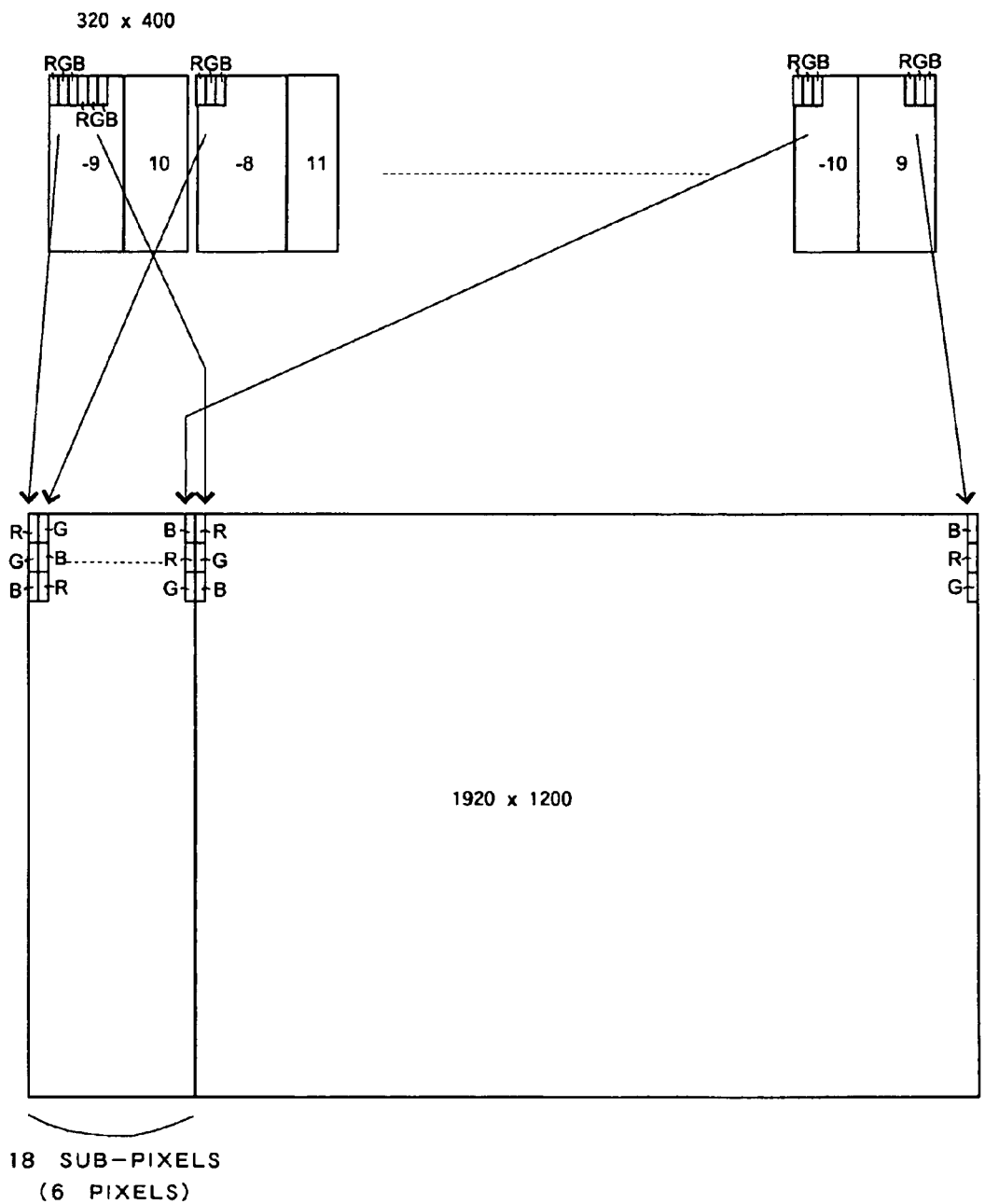
FIG. 16 is a schematic diagram showing an image forming method according to the embodiment.

FIG. 15 shows a schematic view of an image formed by a three-dimensional image display method. Cameras 429 arranged at regular intervals in the horizontal direction are controlled so as to pick up images of the projection face 422. Reference numeral 421 indicates the object to be displayed. In FIG. 15, L represents the viewing distance, P indicates the pitch of the cameras 429, Zn indicates the three-dimensional image display range on the near region, and Zf indicates the three-dimensional image display range on the far region. The images of the respective directions perspectively projected on the projection face 422 (parallax component images) are formed in various regions on the projection face, as shown in FIG. 6. However, the images are combined into the groups of combined images shown in FIG. 7 or the totally combined image shown in FIG. 8. FIG. 16 shows the method of converting images from this format. The combined image containing the camera image (#−9) at the right end of the viewing zone is placed every eighteen sub pixels, starting from the first column from the left end toward the right end of a parallax interleaved image. The three sub pixels in each pixel in the combined image are shuffled in the vertical direction. The combined image that contains the camera image (#−8) and is the second combined image from the right end of the viewing zone is placed every eighteen sub pixels, starting from the second column from the left end toward the right end of the parallax interleaved image. The three sub pixels in each pixel in the combined image are shuffled in the vertical direction. This operation is repeated. Lastly, the combined image containing the camera image (#9) at the left end of the viewing zone is placed every eighteen sub pixels, starting from the eighteenth column from the left end toward the right end of the parallax interleaved image. The three sub pixels in each pixel in the combined image are shuffled in the vertical direction. Through the one-to-one converting operation, the parallax interleaved image is completed on the elemental image display face.

Figure 17:
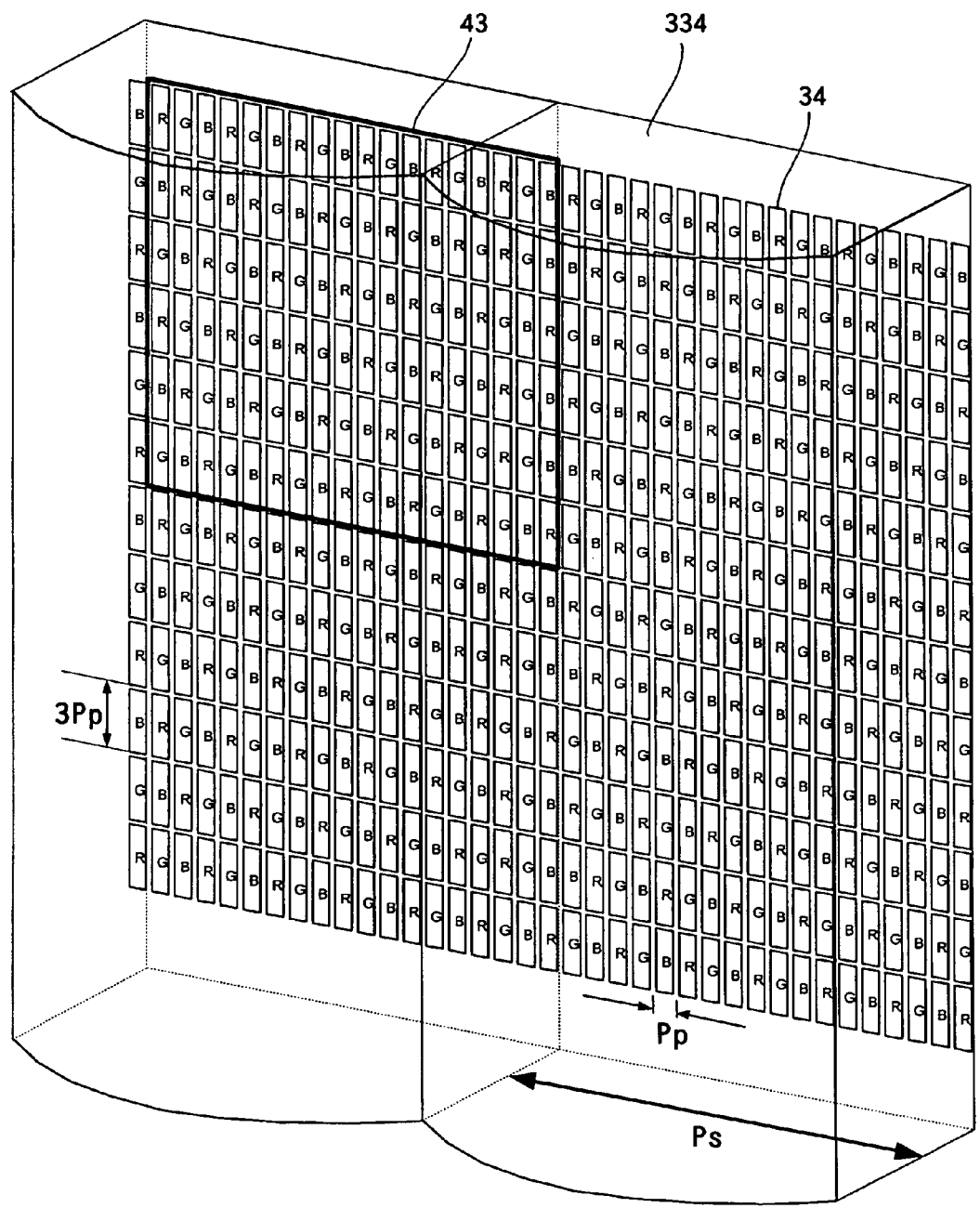
FIG. 17 is a schematic perspective view showing the pixel arrangement by the elemental image display unit of a three-dimensional image display device.

FIG. 17 schematically shows a part of the structure of the three-dimensional image display device of this embodiment. The lenticular sheet 334 formed with cylindrical lenses having optical apertures extending in the vertical direction is provided as the optical plate on the front face of the display face of the flat elemental image display unit such as a liquid crystal panel. The optical apertures may have diagonal shapes or step-like shapes. On the display face, sub pixels 34 having the aspect ratio of 3:1 are arranged in a matrix fashion. Here, the sub pixels 34 are aligned along straight lines in the horizontal direction and along straight lines in the vertical direction. Also, the sub pixels 34 are arranged so that red pixels, green pixels, and blue pixels appear in cycles in the horizontal direction on the same row and the same column. The color arrangement is generally known as a mosaic arrangement.

Figure 18:
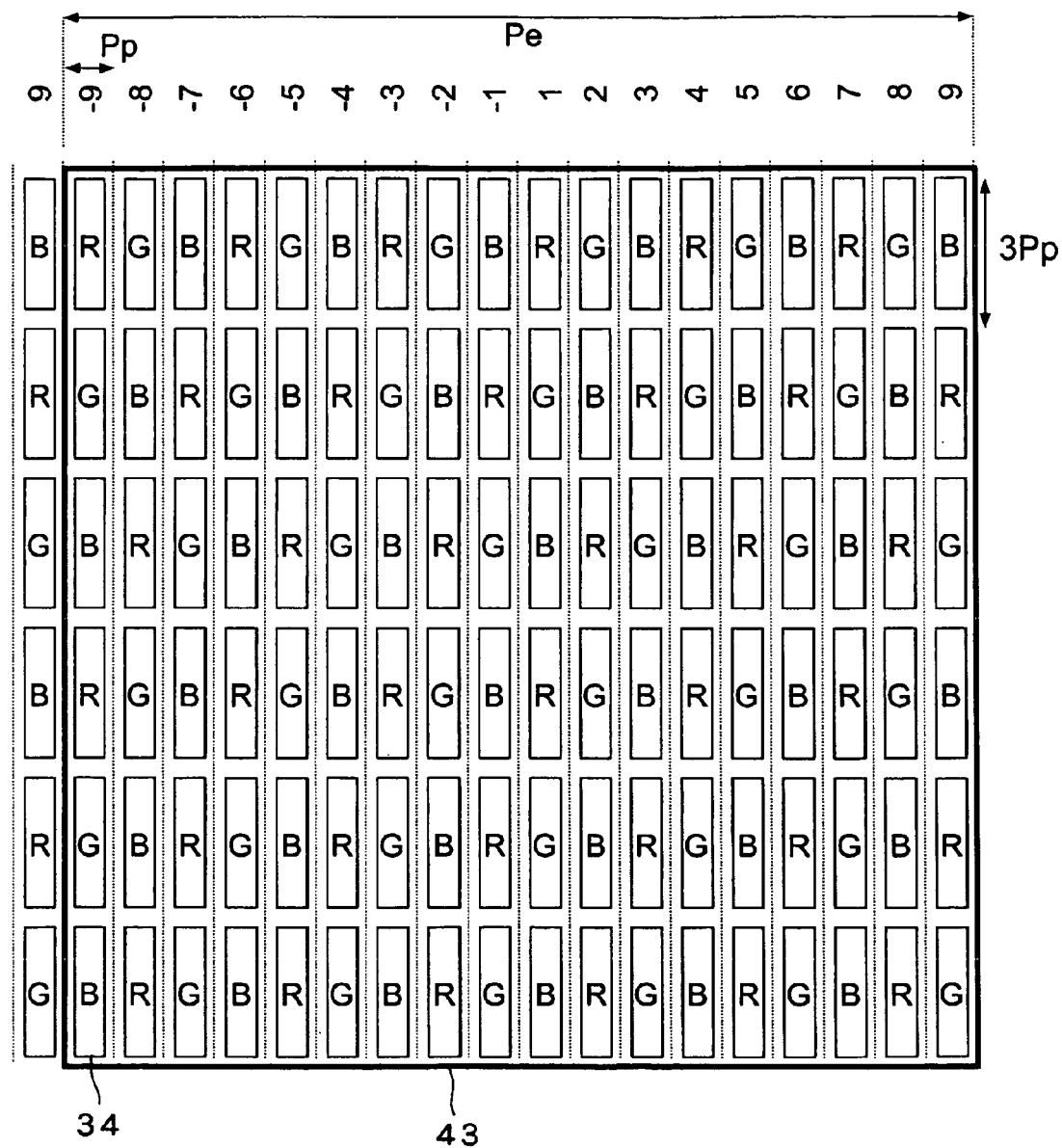
FIG. 18 is a schematic front view showing the pixel arrangement and the parallax image arrangement by the elemental image display unit of a three-dimensional image display device.

FIG. 18 shows an example plan view of a pixel arrangement. The numbers "−9" through "9" are the parallax numbers, and each two neighboring parallax numbers are allotted to two neighboring columns. The number of cycles of sub pixels in each row is three times larger than the number of cycles of sub pixels in each column. On the display screen shown in FIG. 18, the sub pixels 34 arranged in eighteen columns and six rows constitute one effective pixel 43 (this effective pixel 43 is indicated by a bold-line frame in FIG. 17), or the sub pixels 34 arranged in eighteen columns and three rows constitute one effective pixel. With the display unit having this structure, a three-dimensional image having eighteen parallaxes in the horizontal direction can be displayed. In a case where this display structure is employed in a multi-viewpoint structure, the number of viewpoints is eighteen, the elemental image pitch is eighteen sub pixels, and the horizontal pitch of the optical plate becomes smaller than eighteen sub pixels.

Figure 19:
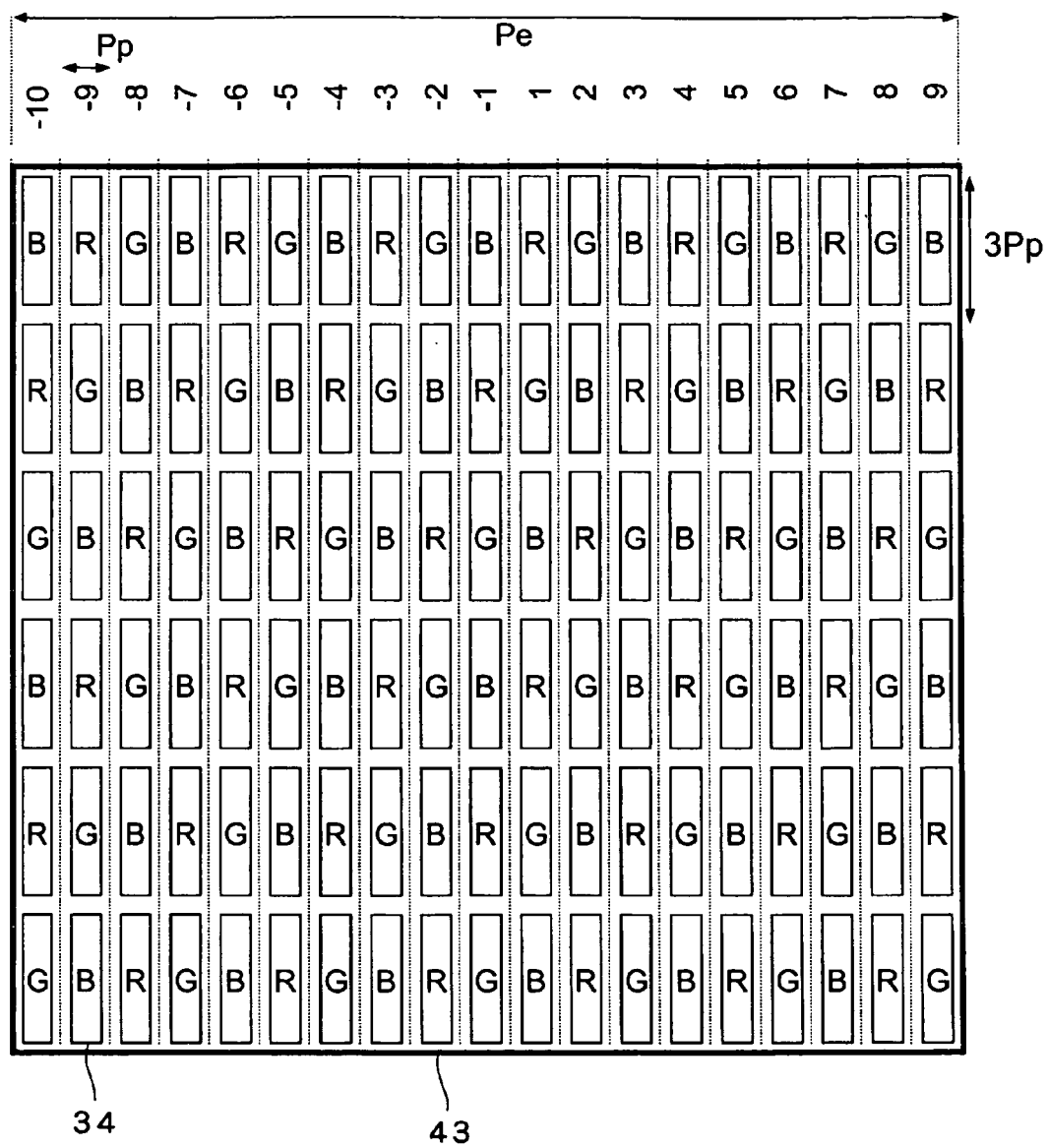
FIG. 19 is a schematic front view showing the pixel arrangement and the parallax image arrangement by the elemental image display unit of a three-dimensional image display device.

In a case of an IP type, elemental image boundaries are formed at a slightly larger interval than the total width of eighteen sub pixels (18.036, for example) in such a structure that the parallax barrier pitch Ps is equivalent to eighteen sub pixels and combinations of parallel rays are formed. Accordingly, the width of an effective pixel is equivalent to eighteen columns or nineteen columns, depending on its location in the display plane. More specifically, the average value of the elemental image pitch is larger than the total width of eighteen sub pixels, and the horizontal pitch of the optical plate is equivalent to the total width of eighteen sub pixels. FIG. 19 shows an example case where the width of an effective pixel is equivalent to nineteen columns.

Figure 20:
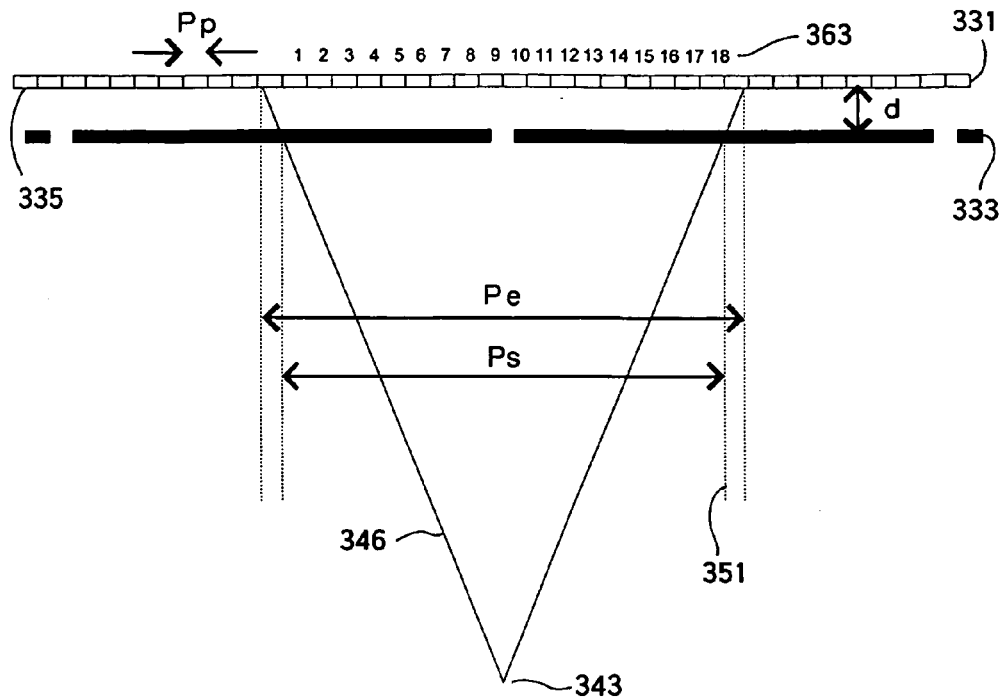
FIG. 20 is a schematic diagram showing the positional relationship among the pixels, the element images, and the parallax barrier by a one-dimensional IP method.
Figure 21:
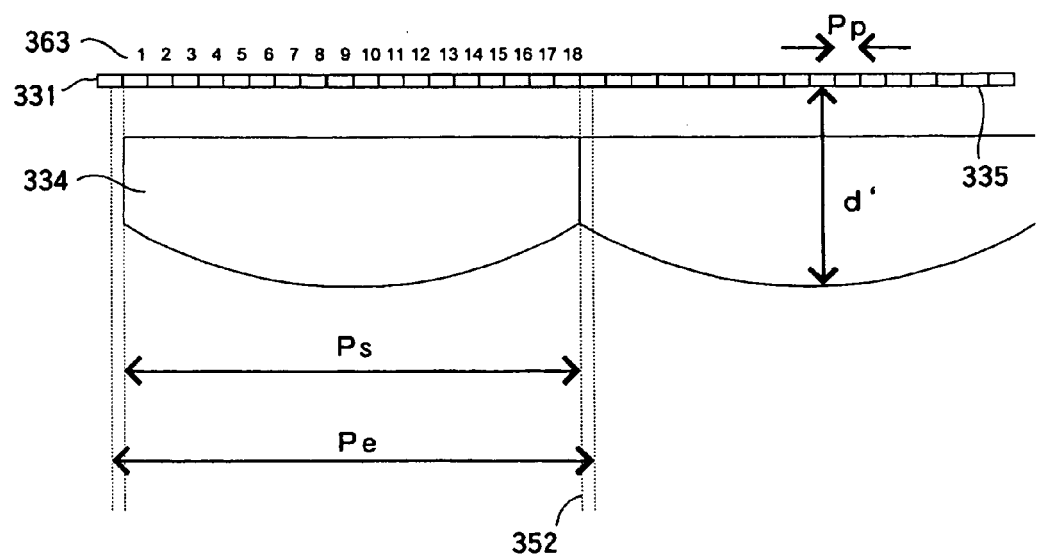
FIG. 21 is a schematic diagram showing the positional relationship among the pixels, the elemental images, and the lenticular plate by a one-dimensional IP method.

FIGS. 20 and 21 are schematic horizontal cross-sectional views of the display unit of a three-dimensional image display device. As shown in FIGS. 20 and 21, the horizontal-direction pitch Ps (interval) of the slits 333 or the lenticular lenses of the lenticular sheet 334 is set to the same value as the total width of an integral number of sub pixels. More specifically, central axes 351 extending through the centers between the slits 332 and reference axes 352 extending through the boundaries between the lenticular lenses pass through the boundaries between the sub pixels. An integral number of sub pixels 335 are provided in the region between the central axes 351 and the region between the reference axes 352, and the horizontal-direction pitch Ps (interval) of the central axes 351 and the reference axes 352 is fixed to a constant value. In the examples shown in FIGS. 20 and 21, the pitch Ps is set to the same value as the total width of eighteen sub pixels. The parallax barrier distance d between the display face (pixel plane) 331 of the elemental image display unit and the parallax barriers 332 and 334 is effectively set to approximately 2 mm, with the refractive indexes of the glass substrate and the lens material being taken into consideration. In FIGS. 20 and 21, reference numeral 343 indicates the viewing distance plane, and reference numeral 363 indicates the numbers allotted to parallax component images.

Figure 22:
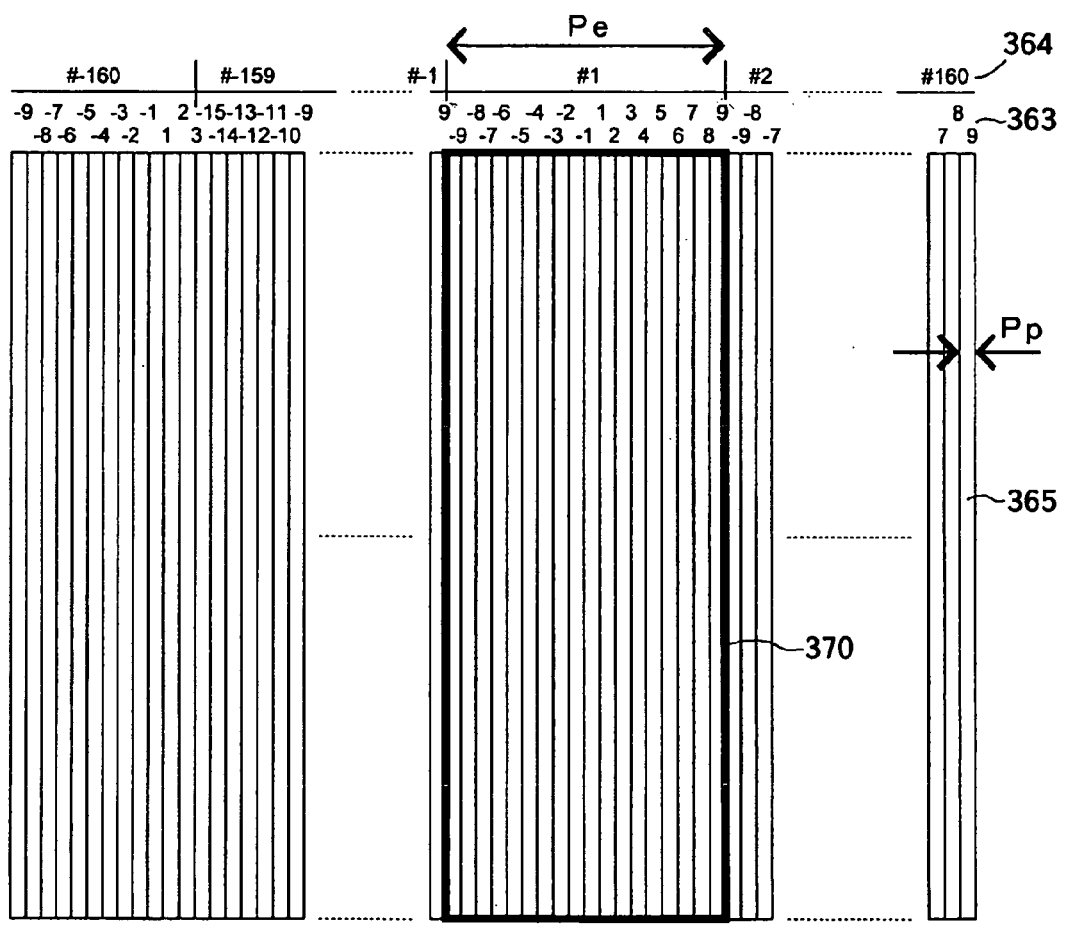
FIG. 22 is a schematic diagram showing an image arranging method to be performed by the elemental image display unit of a three-dimensional image display device.

FIG. 22 is a conceptual diagram of the elemental image display unit of a three-dimensional image display device of an IP type in accordance with an embodiment of the present invention. FIG. 22 shows a front view of the display unit for explaining a method of arranging images in the display plane of the elemental image display unit. The display plane of the elemental image display unit is divided into elemental images 370 corresponding to the respective apertures (the opening portions of the optical plate). Each one elemental image 370 is formed with eighteen or nineteen sub pixel columns 365 in accordance with the IP method. The total number of sub pixel columns to which parallaxes can be allotted is 5760, and the number of apertures is 320 (in FIG. 22, the zone 364 showing the aperture numbers includes the range of #−160 to #−1 and the range of #1 to #160). The aperture pitch Ps is equivalent to the total width of eighteen sub pixels. In FIG. 22, the sub pixel columns 365 are provided with a region 363 showing the corresponding parallax numbers (in this example case, thirty directions of the parallax numbers −15 through −1 and the parallax numbers of 1 through 15). The elemental image 370 of the aperture number #1 is formed with eighteen parallax columns of the parallax numbers −9 through −1 and the parallax numbers 1 through 9. The elemental image of the aperture number #−159 is formed with eighteen parallax columns of the parallax numbers −15 through −1 and the parallax numbers 1 through 3. Since the width of each elemental image 370 is slightly larger than the total width of eighteen sub pixels, the boundary between each two elemental images 370 is adjusted to the closest sub pixel column boundary (a conventional A-D conversion method). In this case, the number of sub pixel columns with respect to an aperture is eighteen for most of the apertures. However, some of the apertures have nineteen sub pixel columns (see FIGS. 18 and 19). Beyond each aperture having nineteen sub pixel columns, the parallax numbers in each aperture are shifted by one. The numbers allotted to the apertures having nineteen sub pixel columns are #14, #42, #70, #98, #125, and #153 (plus the negative numbers of those numbers) (in a case where the viewing distance is 1000 mm).

In FIG. 14, the lens numbers at which the placement of parallax images in the respective directions is started and ended (the 3-D pixel numbers in the table) are shown. In this table, the corresponding sub pixel column numbers of the elemental image display unit (a liquid crystal panel) are also shown.

As described above, in accordance with the present invention, generation of broken images can be readily restrained by adjusting the viewing zone in a one-dimensional IP structure, without an increase in processing load and a decrease of the viewing zone.

It should be noted that the present invention is not limited to the above embodiments, but modifications may be made to the components of those embodiments, without departing from the scope of the invention.

Also, the components disclosed in the above embodiments may be combined to form various other embodiments. For example, some of the components disclosed in the above embodiments may be eliminated, or the components of different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

The invention claimed is:

1. A three-dimensional image display device comprising:
an image display unit configured to display a plurality of elemental images including a plurality of parallax component images on a display plane;
an optical plate facing the image display unit and including a plurality of optical apertures configured to control a direction of light emitted from the image display device, each optical aperture being associated with one of the plurality of elemental images, extending along a first direction and arranged in a second direction; and
an image data converting unit including:
an elemental image width adjustment value calculating unit configured to calculate an adjustment in an average value of widths of the plurality of elemental images;
a pixel conversion rule generating unit configured to generate a conversion rule for converting pixels of an input image based on the calculated adjustment; and
a pixel converting unit configured to convert one or more of the pixels of the input image to be displayed by the image display unit.

2. The device according to claim 1, wherein the image data converting unit further includes a temperature detecting unit configured to detect a temperature in a vicinity of the device and wherein the elemental image width adjustment value calculating unit uses the detected temperature to calculate the adjustment.

3. The device according to claim 1, wherein the image data converting unit further includes a distance detecting unit that detects a viewer distance and wherein the elemental image width adjustment value calculating unit uses the detected viewer distance to calculate the adjustment.

4. The device according to claim 1, wherein the image data converting unit is further configured to determine missing image data based on the adjustment and accordingly converts the one or more of the pixels of the input image.

5. The device according to claim 4, wherein the missing image data includes missing pixels located between an old viewing boundary and a new viewing boundary and wherein the old viewing boundary is changed to the new viewing boundary based on the adjustment.

6. The device according to claim 5, wherein the pixel converting unit is further configured to replace information related to the missing pixels with information related to neighboring pixels.

7. The device according to claim 1, wherein the pixel converting unit is further configured to replace information related to the one or more of the pixels with information related to neighboring pixels.

8. A three-dimensional image display method for displaying a three-dimensional image, the method performed by a three-dimensional image display device which comprises an image display unit configured to display a plurality of elemental images including a plurality of parallax component images on a display plane; and an optical plate facing the image display unit and including a plurality of optical apertures, each optical aperture being associated with one of the plurality of elemental images, extending along a first direction and arranged in a second direction, the method comprising:

calculating an adjustment in an average value of widths of the plurality of elemental images;
generating a conversion rule for converting pixels of an input image based on the calculated adjustment; and
converting one or more of the pixels of the input image to be displayed by the image display unit.

9. The method according to claim 8, further comprising converting image data into a display format of the elemental image display unit through a selective converting operation in which some pixels in an input multi-viewpoint image are not converted but some other pixels are converted at two or more locations.

10. The method according to claim 8, further comprising converting image data into a display format of the elemental image display unit through a selective converting operation in which some pixels in a format having pixels of an input multi-viewpoint image arranged in a tile-like fashion but some other pixels are converted at two or more locations.

11. The method according to claim 8, further comprising determining missing image data based on the adjustment and accordingly converting the one or more of the pixels of the input image.

12. The method according to claim 11, wherein determining the missing image data includes determining missing pixels located between an old viewing boundary and a new viewing boundary and wherein the old viewing boundary is changed to the new viewing boundary based on the adjustment.

13. The method according to claim 12, further comprising replacing information related to the missing pixels with information related to neighboring pixels.

14. The method according to claim 8, further comprising:
detecting a distance from the display plane to a viewer; and
calculating the adjustment based on the detected distance.

15. The method according to claim 8, further comprising replacing information related to the one or more of the pixels with information related to neighboring pixels.

16. The method according to claim 8, further comprising detecting a temperature in a vicinity of the device and using the detected temperature to calculate the adjustment.

* * * * *